US012780544B2

(12) United States Patent
Iijima et al.

(10) Patent No.: US 12,780,544 B2
(45) Date of Patent: Nov. 3, 2026

(54) STORAGE RACK SUPPLY SYSTEM, SHIPMENT SYSTEM, AND STORAGE RACK HANDLING DEVICE

(71) Applicant: HIRATA CORPORATION, Kumamoto (JP)

(72) Inventors: Atsuhiko Iijima, Kumamoto (JP); Shuhei Morita, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 609 days.

(21) Appl. No.: 18/451,307

(22) Filed: Aug. 17, 2023

(65) Prior Publication Data

US 2023/0391552 A1 Dec. 7, 2023

Related U.S. Application Data

(63) Continuation of application No. PCT/JP2021/010833, filed on Mar. 17, 2021.

(51) Int. Cl.
*B65G 1/10* (2006.01)
*B65G 1/14* (2006.01)
*B65G 47/24* (2006.01)

(52) U.S. Cl.
CPC ................ *B65G 1/10* (2013.01); *B65G 1/14* (2013.01); *B65G 47/24* (2013.01); *B65G 2201/0273* (2013.01)

(58) Field of Classification Search
CPC . B65G 1/10; B65G 1/14; B65G 47/24; B65G 2201/0273
See application file for complete search history.

(56) References Cited

U.S. PATENT DOCUMENTS 2,956,763 A 10/1960 D' Area
3,499,398 A 3/1970 Murray
(Continued)

FOREIGN PATENT DOCUMENTS

CN 107055111 A 8/2017
CN 109279293 A 1/2019
(Continued)

OTHER PUBLICATIONS

International Search Report (PCT/ISA/210) with English translation, and Written Opinion (PCT/ISA/237) mailed on Jun. 8, 2021, by the Japan Patent Office as the International Searching Authority for International Application No. PCT/JP2021/010833.
(Continued)

*Primary Examiner* — Veronica Martin
(74) *Attorney, Agent, or Firm* — BUCHANAN INGERSOLL & ROONEY PC

(57) ABSTRACT

A storage rack supply system used for supplying a storage rack that includes a base portion and a partition portion that is foldable and that is capable of being switched between a storage disabled state in which the partition portion is folded with respect to the base portion and a storage enabled state in which the partition portion is raised with respect to the base portion, the storage rack supply system including: a rack supply section supplying the storage rack being in the storage disabled state; a rack preparation section changing the storage rack from the storage disabled state to the storage enabled state; a transport device transporting the storage rack being in the storage disabled state from the rack supply section to the rack preparation section; and a rack unloading section unloading the storage rack being in the storage enabled state from the rack preparation section.

19 Claims, 18 Drawing Sheets

(56) References Cited

U.S. PATENT DOCUMENTS

| | | | | |
|---|---|---|---|---|
| 3,946,876 A * | 3/1976 | Jay | B65D 19/08 211/195 |
| 2006/0254881 A1 | 11/2006 | Furthmueller et al. | |

FOREIGN PATENT DOCUMENTS

| | | | |
|---|---|---|---|
| CN | 110844438 | A | 2/2020 |
| DE | 102005055358 | A1 | 5/2007 |
| JP | S62280105 | A | 12/1987 |
| JP | H0834522 | A | 2/1996 |
| JP | 2539241 | B2 | 10/1996 |
| JP | H10310208 | A | 11/1998 |
| JP | 2017036152 | A | 2/2017 |

OTHER PUBLICATIONS

Office Action (Notification of the First Office Action) issued on Nov. 24, 2025, by the China National Intellectual Property Administration in corresponding Chinese Patent Application No. 202180092614. 5, and an English Translation of the Office Action. (22 pages).

* cited by examiner

STORAGE RACK SUPPLY SYSTEM, SHIPMENT SYSTEM, AND STORAGE RACK HANDLING DEVICE

CROSS-REFERENCE TO RELATED APPLICATIONS

The present application is a continuation application of International Application No. PCT/JP2021/010833, filed Mar. 17, 2021. The contents of the application are incorporated herein by reference.

BACKGROUND OF THE INVENTION

Technical Field of the Invention

The present disclosure provides a storage rack supply system that supplies a storage rack that is capable of being switched between a storage disabled state in which a partition portion is in a folded state and a storage enabled state in which the partition portion is raised to be capable of storing, a shipment system that stores and ships an object to be stored in the storage rack capable of storing, and a storage rack handling device for handling storage racks that can be switched between the storage disabled state and the storage enabled state.

Description of Related Art

Conventionally, for example, Japanese Unexamined Patent Application Publication No. H10-310208 A (hereinafter referred to as Patent Document 1) discloses that a foldable storage rack is used to transport large tires (objects to be stored) used for buses and trucks. After support pillars (partition portions) of the storage rack are raised to make the storage rack in a storage enabled state, the storage rack is tilted to store the tires in the storage rack by a forklift. Furthermore, after changing a posture of the storage rack horizontally by a posture changing device of the storage rack, a plurality of large tires stored together with the storage rack are transported to the storing section by the forklift.

Although Patent Document 1 does not particularly describe a change in a storage form of the storage rack, it is assumed that a worker performs such a change.

Japanese Patent No. 2539241 B (hereinafter referred to as Patent document 2) discloses that a group of stacked tires is transported from a storage section while maintaining a stacked state. While being transported, the tires are separated one by one and inspected. After that, a plurality of tires of the same type and the same size are stacked to form again a group of stacked tires and transported to the shipping section. The group of stacked tires transported to the shipping section is changed in posture to a horizontal posture that is in a horizontally aligned state. The group of stacked tires is stored in the storage rack in a horizontal posture. After that, storage racks in which the groups of tires are stored are stacked.

SUMMARY OF INVENTION

In Patent Document 1, a storage rack that can be switched between a storage enabled state and a storage disabled state is employed to transport a group of tires. It is assumed that the worker who operates the forklift switches the state of the storage rack each time before storing the tires. In this case, there is a possibility that work efficiency will be lowered. In addition, in the case of a large-mass object to be stored (for example, a large tire or a roll body in which a continuous sheet-shaped member is wound into a roll), since a storage rack with high strength and rigidity is adopted, the mass of a movable partition itself also increases. In this case, switching the state of the storage rack by the worker may increase the physical burden on the worker.

Patent Document 2 discloses a shipment system that uses storage racks that are in a storage enabled state. In this shipment system, in order to prepare a plurality of storage racks that are in the storage enabled state, a space for preparation is required.

The present disclosure has been made in view of the circumstances of the conventional art described above, and an object of the present invention is to provide a storage rack supply system, a shipment system, and a storage rack handling device that efficiently switch the storage rack from a storage disabled state to a storage enabled state.

In order to solve the above problems, the present invention proposes the following means.

According to a first aspect of the present disclosure, a storage rack supply system is used for supplying a storage rack that includes a base portion and a partition portion that is foldable with respect to the base portion and that is capable of being switched between a storage disabled state in which the partition portion is folded with respect to the base portion and a storage enabled state in which the partition portion is raised with respect to the base portion. The storage rack supply system includes: a rack supply section that supplies the storage rack being in the storage disabled state; a rack preparation section that changes the storage rack being in the storage disabled state to the storage rack being in the storage enabled state; a transport device that transports the storage rack being in the storage disabled state from the rack supply section to the rack preparation section; and a rack unloading section that unloads the storage rack being in the storage enabled state from the rack preparation section.

According to this configuration, the storage rack being in the storage disabled state is supplied by the rack supply section, and the storage rack being in storage disabled state is transported from the rack supply section to the rack preparation section by the transport device. After that, the rack preparation section changes the storage rack being in the storage disabled state to the storage rack being in the storage enabled state. Then, it is possible to unload the storage rack being in the storage enabled state from the rack preparation section by the rack unloading section.

In this way, switching the storage rack from the storage disabled state to the storage enabled state is performed by a dedicated machine called the rack preparation section, thereby it is possible to efficiently perform switching of the storage rack from the storage disabled state to the storage enabled state.

According to the storage rack supply system according to the above first aspect, the storage rack may include a first partition portion and a second partition portion as the partition portion, one of the first partition portion and the second partition portion that are in the storage disabled state is arranged above the other, the rack preparation section has an upper partition detection portion that detects the partition portion positioned above from the first partition portion and the second partition portion, the storage rack supply system includes a controller that controls the partition moving unit, the engaging portion engages with a first engaged portion that is the engaged portion set in the first partition portion, the engaging portion engages with a second engaged portion that is the engaged portion set in the second partition portion, wherein the controller includes: a discrimination unit that is configured to discriminate, based on a detection result of the upper partition detection portion, which of the first partition portion and the second partition portion that are in the storage disabled state with respect to the base portion is positioned above, and an engagement position determination unit that is configured to determine, based on a discrimination result of the discrimination unit, a first engagement position with respect to the first engaged portion with which the engaging portion engages or a second engagement position with respect to the second engaged portion with which the engaging portion engages.

According to a second aspect of the present disclosure, a shipment system used for shipping in which an object to be stored is stored in a storage rack is provided, the storage rack including a base portion and a partition portion that is foldable with respect to the base portion, and the storage rack being capable of switching between a storage disabled state in which the partition portion is folded with respect to the base portion and a storage enabled state in which the partition portion is raised with respect to the base portion, the shipment system includes: a rack supply section that supplies the storage rack being in the storage disabled state; a rack preparation section that changes the storage rack being in the storage disabled state to the storage rack being in the storage enabled state; a transport device that transports the storage rack being in the storage disabled state from the rack supply section to the rack preparation section; a rack unloading section that unloads the storage rack being in the storage enabled state from the rack preparation section; and a storage section that stores an object to be stored in the storage rack being in the storage enabled state.

According to this configuration, the storage rack in the storage disabled state is supplied by the rack supply section, and the storage rack in the storage disabled state is transported from the rack supply section to the rack preparation section by the transport device. After that, the rack preparation section changes the storage rack in the storage disabled state to the storage rack in the storage enabled state. Then, it is possible to unload the storage rack in the storage enabled state from the rack preparation section by the rack unloading section.

In this way, switching the storage rack from the storage disabled state to the storage enabled state is performed by a dedicated machine called the rack preparation section, thereby it is possible to efficiently perform switching of the storage rack state from the storage disabled state to the storage enabled state.

Furthermore, it is possible to store the object to be stored to the storage rack that is in a storage enabled state by the storage section.

According to a third aspect of the present disclosure, a storage rack handling device is provided that includes a base portion and a partition portion being foldable with respect to the base portion, and that handles a storage rack capable of being switched between a storage disabled state in which the partition portion is folded with respect to the base portion and a storage enabled state in which the partition portion is raised with respect to the base portion, the storage rack handling device includes: a preparation positioning unit that performs positioning of the storage rack being in the storage disabled state; and a partition moving unit that has an engaging portion engaging with an engaged portion set in the partition portion and that moves the engaging portion.

According to this configuration, the preparation positioning unit positions the storage rack that is in the storage disabled state. The partition moving unit moves the engaging portion, thereby moving the engaged portion of the partition portion that engages with the engaging portion. As a result, it is possible to change to the storage rack that is in the storage enabled state by raising the partition portion of the storage rack with respect to the base portion.

As described above, it is possible to separately perform the positioning of the storage rack and switching to the storage enabled state by the preparation positioning unit and the partition moving unit, respectively.

Switching the storage rack from the storage disabled state to the storage enabled state is performed by a dedicated machine called the storage rack handling device, thereby it is possible to efficiently perform switching of the storage rack from the storage disabled state to the storage enabled state.

Effects of the Invention

According to the storage rack supply system, the shipment system, and the storage rack handling device of the present invention, it is possible to efficiently switch the storage rack from the storage disabled state to the storage enabled state.

EMBODIMENTS FOR CARRYING OUT THE INVENTION

An embodiment of a shipment system according to the present invention will be described below with reference to FIGS. 1 to 22.

Figure 1:
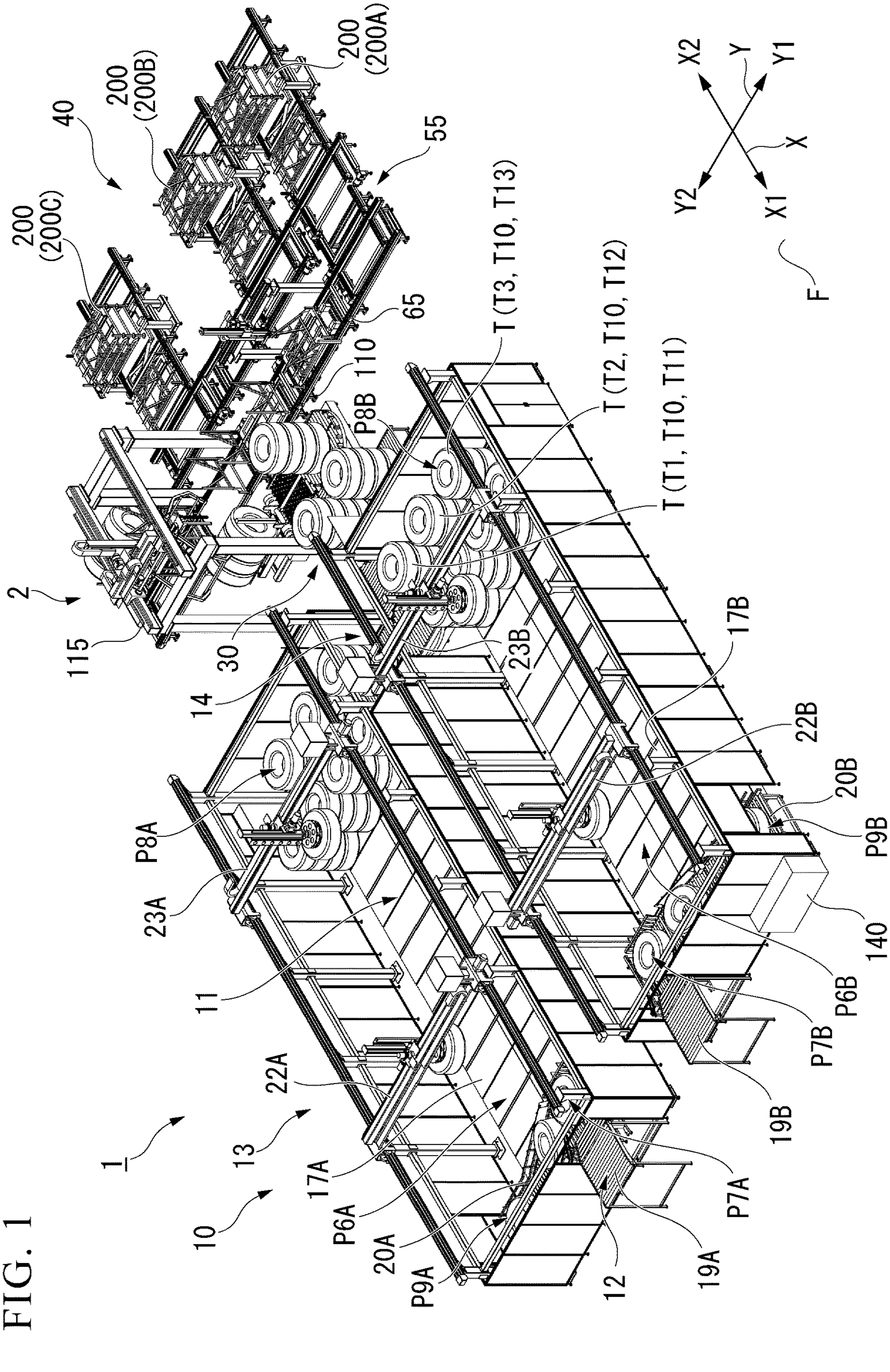
FIG. 1 is a perspective view of a shipment system according to one embodiment of the present invention.

The shipment system 1 shown in FIG. 1 is used when a tire (an object to be stored) T that will be stored in a later-described storage object storing section 10 is stored in a storage rack 200 and shipped. In FIG. 1, the number of tires T is shown with a small quantity. First, the tires T and the storage rack 200 will be described below.

In the present embodiment, as tires T, a first tire (first object to be stored) T1, a second tire (second object to be stored) T2, and a third tire T3 are used. For example, the first tire T1, the second tire T2, and the third tire T3 are of the same type but are different in size. A size of an outer diameter of the tire T of the present embodiment increases in the order of the first tire T1, the second tire T2, and the third tire T3. The first tire T1 is a tire T of a first classification in terms of type and size. The second tire T2 is a tire T of a second classification whose size is different from that of the first classification. The third tire T3 is a tire T of a third classification whose size is different from those of the first classification and second classification.

In addition, in FIG. 1 and subsequent figures, the tires T1, T2, and T3 are shown with the same size.

Examples of types of tires T include summer tires, winter tires, radial tires, bias tires, and the like. The size of the tire T is expressed by a combination of, for example, a width of the tire T, an aspect ratio, a rim diameter used for the tire T, and the like.

In addition, the tires T1, T2, and T3 may be different types from each other. In this case, the first classification, second classification, and third classification are different types.

More generally speaking, the tires T1, T2, and T3 are required to be different from each other in at least one of type and size.

In the present embodiment, as the tire T, three classifications of tires T1, T2, and T3 are used. However, the classification of the tires T used in the shipment system 1 is not limited to this, and may be one classification, two classifications, or four or more classifications.

Figure 2:
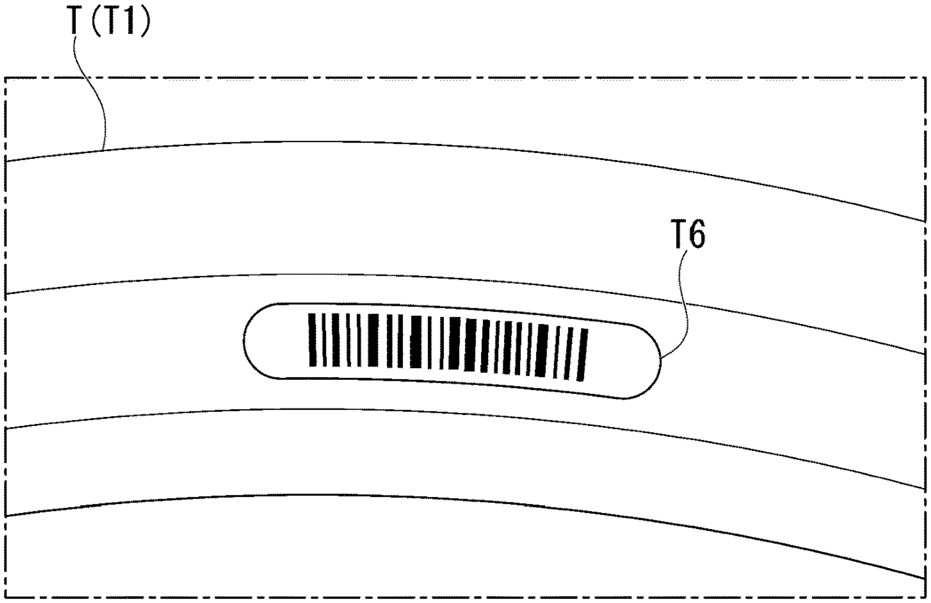
FIG. 2 is an enlarged view of a tire used in the same shipment system.

FIG. 2 shows the first tire T1 as an example of the tire T. A tire code T6 on which tire information (to-be-stored information) is described is attached to the first tire T1. The tire information includes information used to identify the type and size of the first tire T1.

In the illustrated example, the tire information is indicated by a bar code, but the tire information may be indicated by a QR code (registered trademark) or the like, or may be recorded in an IC tag attached to the tire T.

Tire codes similar to the tire code T6 of the first tire T1 are also attached to the tires T2 and T3.

As shown in FIG. 1, in the present embodiment, the storage rack 200 includes a first storage rack 200A, a second storage rack 200B, and a third storage rack 200C that can store the tires T1, T2, and T3. For example, the first storage rack 200A is a storage rack for the first tire T1.

In the present embodiment, the configuration of the first storage rack 200A and the configurations of the storage racks 200B and 200C are the same except for a mounting portion 203A, which will be described later. For this reason, the configuration of the first storage rack 200A is indicated by adding an uppercase letter "A" to numerals of symbols or to numerals and lowercase letters of symbols. The configurations of the storage racks 200B and 200C corresponding to the that of the first storage rack 200A are indicated by adding uppercase letters "B" and "C" to the same numerals of symbols or to the same numerals and lowercase letters of symbols as those of the first storage rack 200A. Therefore, overlapping explanations will be omitted. When the storage racks 200A, 200B, and 200C are referred to without distinction, they are referred to as the storage rack 200.

The same applies to rack supply sections 40A, 40B, 40C, etc., which will be described later.

Figure 3:
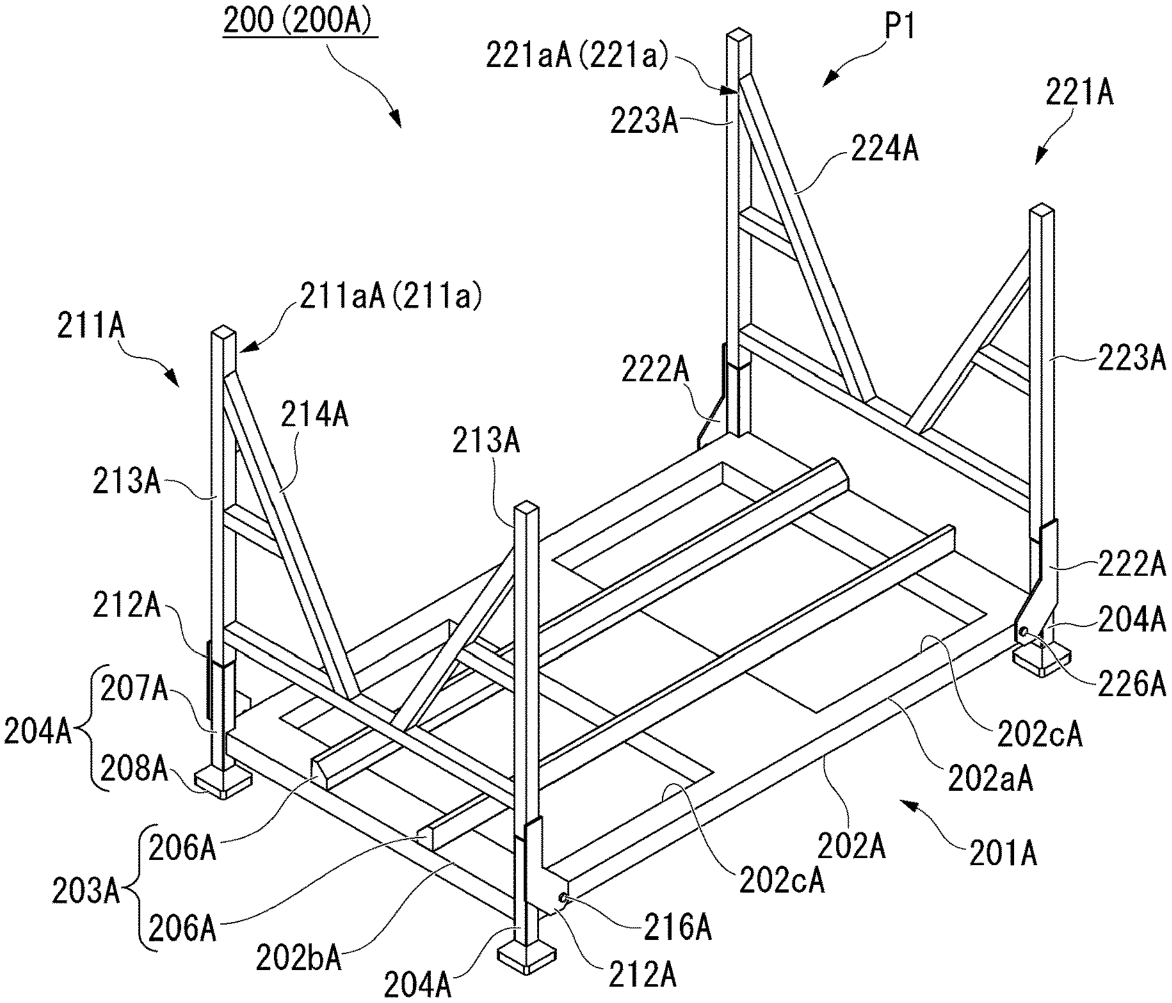
FIG. 3 is a perspective view of a storage rack that is in a storage enabled state used in the same shipment system.

As shown in FIG. 3, the first storage rack 200A includes a bottom portion 201A, a first partition portion (partition portion) 211A, and a second partition portion (partition portion) 221A. FIG. 3 shows a storage enabled state P1 of the first storage rack 200A, the storage enabled state P1 being a state in which one end portions that are supporting end portions of each of the partition portions 211A and 221A are in a state of being supported with respect to a base portion 202A so as to be separated from each other and the other end portions that are moving end portions of each of the partition portions 211A and 221A are moved and raised with respect to the base portion 202A.

The bottom portion 201A has the base portion 202A, the mounting portion 203A, and a support portion 204A.

The base portion 202A has a flat plate shape presenting as a rectangle in plan view. In plan view, a first outer edge **202*a*A of the base portion 202A is longer than a second outer edge 202*b*A orthogonal to the first outer edge 202*a*A. Hereinafter, in the first storage rack 200A, a direction along the first outer edge 202*a*A is referred to as a longitudinal direction as a first direction. A direction along the second outer edge 202*b***A is referred to as a short-side direction as a second direction.

A pair of penetration openings **202*c*A are formed in the base portion 202A so as to be spaced apart from each other in the longitudinal direction. A pair of through-holes 202*c***A each present as a rectangular shape in plan view.

The mounting portion 203A has a pair of mounting members 206A. The pair of mounting members 206A are rod-shaped members extending in the longitudinal direction. The pair of mounting members 206A are arranged so as to be spaced apart from each other in the short-side direction. The pair of mounting members 206A are fixed to an upper surface of the base portion 202A.

The bottom portion 201A includes four support portions 204A. Each support portion 204A has a first support portion 207A and a receiving portion 208A. The first support portion 207A is a rod-shaped member extending in a vertical direction. An intermediate portion of the first support portion 207A in the vertical direction is fixed to each corner of the base portion 202A.

Figure 4:
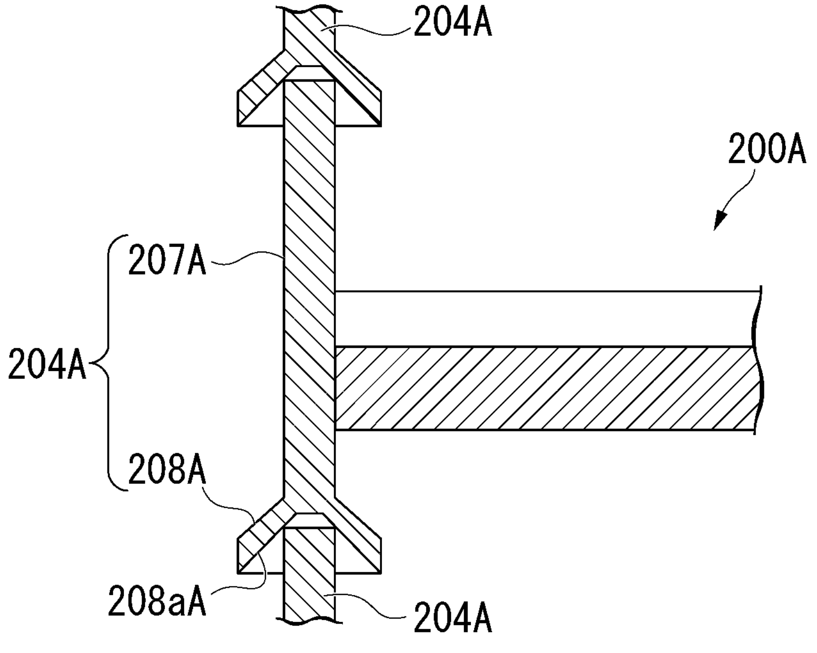
FIG. 4 is a cross-sectional view of a main part of the same storage rack.

The receiving portion 208A is provided at a lower end portion of the first support portion 207A. As shown in FIG. 4, a lower surface of the receiving portion 208A is formed with a recess **208*a*A that recesses by including an inclined surface that gradually inclines toward the first support portion 207**A located above.

As shown in FIG. 3, the first partition portion 211A is attached to a first end portion of the base portion 202A in the longitudinal direction. The first partition portion 211A has a pair of rotation portions 212A, a pair of second support portions 213A, and a connection portion 214A.

The pair of rotation portions 212A are arranged so as to sandwich the base portion 202A in the short-side direction. Each rotation portion 212A is rotatably connected to the base portion 202A via a rotation shaft 216A at a first end portion of the rotation portion 212A.

The second support portion 213A is fixed to a second end portion opposite to the first end portion of the rotation portion 212A. The second support portion 213A is a rod-shaped member extending upward from the rotation portion 212A. The lower end portion of the second support portion 213A fits with an upper end portion of the first support portion 207A of the support portion 204A.

The connection portion 214 is constituted by several rod-shaped members (symbols are omitted). The connection portion 214 connects a pair of the second support portions 213A.

The second partition portion 221A includes a pair of rotation portions 222A, a pair of second support portions 223A, and a connection portion 224A that are structured similarly to the pair of rotation portions 212A, the pair of second support portions 213A, and the connection portion 214A of the first partition portion 211A. The second partition portion 221A is attached to a second end portion provided on the other side that is opposite to the first end portion provided on one side in the longitudinal direction of the base portion 202A.

In the first storage rack 200A configured as described above, as shown in FIG. 5, the support end portions of the partition portions 211A and 221A are supported around the rotation shafts 216A and 226A, thereby being capable of rotating the partition portions 211A and 221A. When the partition portions 211A and 221A are rotated, the moving end portions of the partition portions 211A and 221A move so as to approach the base portion 202A and are positioned substantially along the base portion 202A, so that the partition portions 211A and 221A are folded with respect to the base portion 202A. Then, the first storage rack 200A becomes in a storage disabled state P2 by which the partition portions 211A and 221A are folded with respect to the base portion 202A. The partition portions 211A and 221A of the present embodiment are longer than a half length of the base portion 202A in the longitudinal direction. Therefore, in the partition portions 211A and 221A of the first storage rack 200A that is in the storage disabled state P2, one of the partition portions 211A and 221A is arranged above the other thereof. There is a case such that the first partition portion 211A is arranged above the second partition portion 221A, and a case such that the second partition portion 221A is arranged above the first partition portion 211A.

In this manner, it is possible to switch the first storage rack 200A between the storage enabled state P1 and the storage disabled state P2 by changing an arrangement state of the partition portions 211A and 221A.

Figure 6:
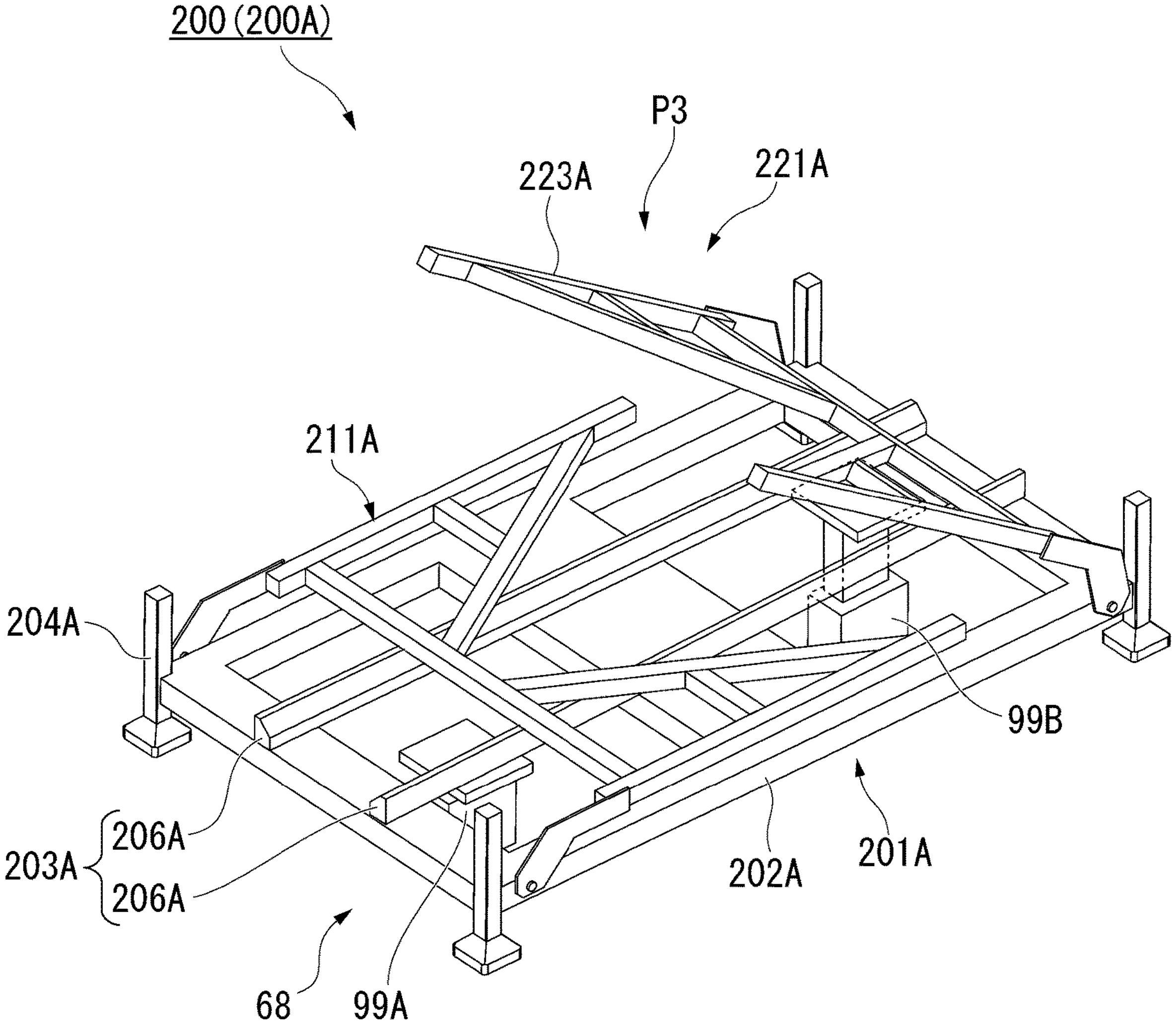
FIG. 6 is a perspective view of the same storage rack when the second partition portion is in an intermediate position.

Furthermore, as shown in FIG. 6, it is possible to move the second partition portion 221A in an intermediate position P3, which is a position of the second partition portion 221A between a position of the second partition portion 221A in the first storage rack 200A being in the storage disabled state P2 and a position of the second partition portion 221A in the storage rack 200A being in the storage enabled state P1.

The same is applied to the first partition portion 211A.

In addition, after the first storage rack 200A is brought into the storage enabled state P1 by butting the second support portion 213A against the first support portion 207A, it is preferable to have a configuration in which the second support portion 213A is capable of being fixed to the first support portion 207A, in the first storage rack 200A. As this configuration, for example, there is a configuration in which the second support portion 213A is dropped into the first support portion 207A and engaged using a groove and a pin.

Also, in the second storage rack 200B, the distance between the pair of mounting rods 206B is longer than the distance between the pair of mounting members 206A of the first storage rack 200A. In the third storage rack 200C, the distance between the pair of mounting rods 206C is longer than the distance between the pair of mounting rods 206B of the second storage rack 200B.

It is preferable that the storage racks 200A, 200B, and 200C be attached with rack codes that describe rack information for identifying each of the storage racks.

Figure 7:
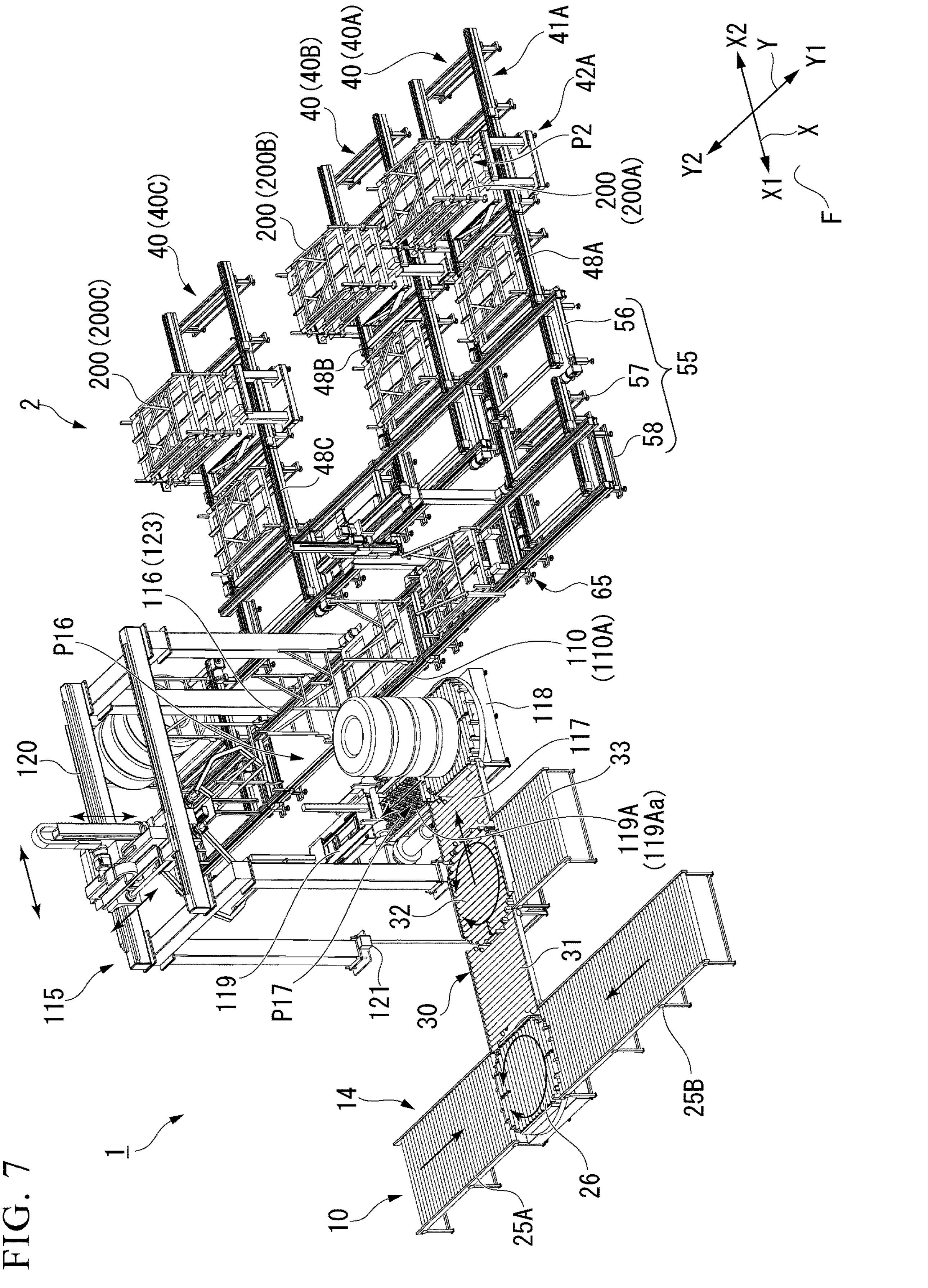
FIG. 7 is an enlarged view of a main part in FIG. 1.

As shown in FIGS. 1 and 7, the shipment system 1 includes a rack supply section 40, a transport device 55, a rack preparation section (storage rack handling device) 65 of the present embodiment, and a rack unloading section 110. The shipment system 1 also includes a storage object storing section 10, a storage transport section 30, and a storage section 115. The shipment system 1 also includes a controller 140.

The rack supply section 40, the transport device 55, the rack preparation section 65, the rack unloading section 110, and the controller 140 constitute the storage rack supply system 2 of the present embodiment. The storage rack supply system 2 is used to supply the storage racks 200.

As shown in FIG. 1, the tires T1, T2, and T3 are stored in the storage object storing section 10. The storage object storing section 10 has a storing area 11, a carry-in-section tire transport unit 12, a tire transport unit 13, and a carry-out-section tire transport unit 14.

The storing area 11 is capable of storing stacked tires T10 (a plurality of tires T) in which tires T of the same type and size are stacked. In the stacked tires T10, the plurality of tires T are stacked in the stacking direction. The stacking direction is a direction along a central axis of the tires T.

First stacked tires T11, which are the stacked tires T10, are constituted by stacking a plurality of first tires T1 in the stacking direction. Second stacked tires T12, which are the stacked tires T10, are constituted by stacking a plurality of second tires T2 in the stacking direction. Third stacked tires T13, which are the stacked tires T10, are constituted by stacking a plurality of third tires T3 in the stacking direction.

Here, a first installation direction X and a second installation direction Y are defined along an installation surface F on which the shipment system 1 is installed. The first installation direction X and the second installation direction Y are orthogonal to each other. The first installation direction X and the second installation direction Y are directions along the horizontal plane.

The storing area 11 has storing bases 17A and 17B. In the storing area 11, storing positions P6A and P6B for actually storing the tires T, pick-up positions P7A and P7B of tires T that were transported from outside the storing area 11 for transferring the tires T to the storing positions P6A and P6B, and carry-out positions P8A and P8B for carrying the tires T out of the storing area 11 from the storing positions P6A and P6B are provided. Further, in the storing area 11, pick-up standby positions P9A and P9B for picking up the stored tire T are provided.

The storing bases 17A and 17B each have a rectangular shape elongated in the first installation direction X in plan view. The storing bases 17A and 17B are arranged side by side in the second installation direction Y. The storing positions P6A and P6B are set on upper surfaces of the storing bases 17A and 17B. Specifically, the storing positions P6A and P6B are positions allocated as part of the storing bases 17A and 17B by the controller 140 according to the size of the storing bases 17A and 17B and the size of the tire T. The stacked tires T11, T12, and T13 are stored at the storing positions P6A and P6B.

The carry-in-section tire transport unit 12 conveys the tires T from outside the storing area 11 to the pick-up positions P7A and P7B. For example, the pick-up positions P7A and P7B are set at one end portion in the storing area 11 which is the first side X1 in the first installation direction X with respect to the storing positions P6A and P6B. In addition, the carry-in-section tire transport unit 12 conveys the tire T to the pick-up standby positions P9A and P9B where the tire T is taken out from the storing area 11. For example, unlike the pick-up positions P7A and P7B, the pick-up standby positions P9A and P9B are set at one end portion in the storing area 11 on a first side X1 in the first installation direction X with respect to the storing positions P6A and P6B.

The carry-in-section tire transport unit 12 has carry-in conveyors 19A and 19B and standby conveyors 20A and 20B. For example, known roller conveyors are used for the carry-in conveyors 19A and 19B and the standby conveyors 20A and 20B. The carry-in conveyors 19A and 19B are arranged over an inside and outside of the storing area 11 at one end portion of the storing area 11 on the first side X1 with respect to the storing bases 17A and 17B. The standby conveyors 20A and 20B are arranged at one end portion of the storing area 11, which is on the first side X1 with respect to storing bases 17A and 17B, so as to face a connection position where the inside and outside of the storing area 11 are connected.

The carry-in conveyors 19A and 19B convey the tires T from outside the storing area 11 to the pick-up positions P7A and P7B. The standby conveyors 20A and 20B convey the tires T to the outside of the storing area 11 from the pick-up positions P7A and P7B or the storing positions P6A and P6B. The standby conveyors 20A and 20B are used when the type and size of the tires T carried into the pick-up positions P7A and P7B are different from the type and size of the tires T that should be stored in the storing area 11, or when the tires T are forcibly excluded from storage objects.

A tire transport unit 13 is provided above the storing area 11. The tire transport unit 13 is capable of picking up the tires T from the pick-up positions P7A and P7B and transporting the tires T from the pick-up positions P7A and P7B to the carry-out positions P8A and P8B.

In addition, the tire transport unit 13 may transport the tires T from the inside of the storing area 11 to the carry-out positions P8A and P8B.

The tire transport unit 13 has first transport units 22A and 22B and second transport units 23A and 23B. Known transport devices that transport the tires T in the first installation direction X and the second installation direction Y are used for the transport units 22A and 22B, and 23A and 23B. The first transport units 22A and 22B pick up the tires T from the pick-up positions P7A and P7B and transport them to the storing positions P6A and P6B. The second transport units 23A and 23B transport the stacked tires T10 (tires T) from the storing positions P6A and P6B to the carry-out positions P8A and P8B. The carry-out positions P8A and P8B are set at the other end portion of the storing area 11, which is the second side X2 opposite to the first side X1 in the first installation direction X with respect to the storing positions P6A and P6B.

The carry-out-section tire transport unit 14 transports the stacked tires T10 from the carry-out positions P8A and P8B provided in the storing area 11 to the storage transport section 30 provided outside the storing area 11. As shown in FIG. 7, the carry-out-section tire transport unit 14 has carry-out conveyors 25A and 25B and a first rotation-transport base 26. The carry-out conveyors 25A and 25B and the first rotation-transport base 26 are arranged at the other end portion of the storing area 11, which is on the second side X2 with respect to the storing bases 17A and 17B.

The carry-out conveyor 25A conveys the stacked tires T10 to one side in the first direction, which is a center side in the second installation direction Y of the storing bases 17A and 17B, and the carry-out conveyor 25B conveys the stacked tires T10 to the other side in the first direction, which is the center side in the second installation direction Y of the storing bases 17A and 17B. The stacked tires T10 are conveyed in a posture in which the stacking direction is along the vertical direction.

The first rotation-transport base 26 is arranged between the carry-out conveyor 25A and the carry-out conveyor 25B. The first rotation-transport base 26 changes a direction of the stacked tires T10 and transports the stacked tires T10 to a predetermined direction of the second side X2 and in a second direction intersecting the first direction.

The storage transport section 30 transports the stacked tires T11, T12, and T13 to the storage section 115. The storage transport section 30 has a first transport conveyor 31, a second rotation-transport base 32, and a second transport conveyor 33.

The first transport conveyor 31 is arranged at a position on the second direction side, which is the second side X2 with respect to the first rotation-transport base 26. The first transport conveyor 31 transports the stacked tires T10 in the second direction, which is the second side X2.

The second rotation-transport base 32 is constituted similarly to the first rotation-transport base 26. The second rotation-transport base 32 is arranged at a position on the second direction side, which is the second side X2 with respect to the first transport conveyor 31. The second transport conveyor 33 is arranged at a position on the first direction side, which is the first side Y1 in the second installation direction Y, with respect to the second rotation-transport base 32. The second transport conveyor 33 transports the stacked tires T10 to one side in the first direction, which is the first side Y1.

As shown in FIG. 7, the rack supply section 40 supplies the storage racks 200 in the storage disabled state P2. The rack supply section 40 has a first rack supply section 40A, a second rack supply section 40B, and a third rack supply section 40C respectively corresponding to the first storage rack 200A, the second storage rack 200B, and the third storage rack 200. The first rack supply section 40A among the rack supply sections 40A, 40B, and 40C will be described below as an example.

In the present embodiment, the rack supply section 40 has three rack supply sections that are the rack supply sections 40A, 40B, and 40C corresponding to the three classifications of the first to third classifications. However, the rack supply section is necessary to provide the corresponding number of the rack supply sections 40 corresponding to the number of classifications of the tires T.

Figure 8:
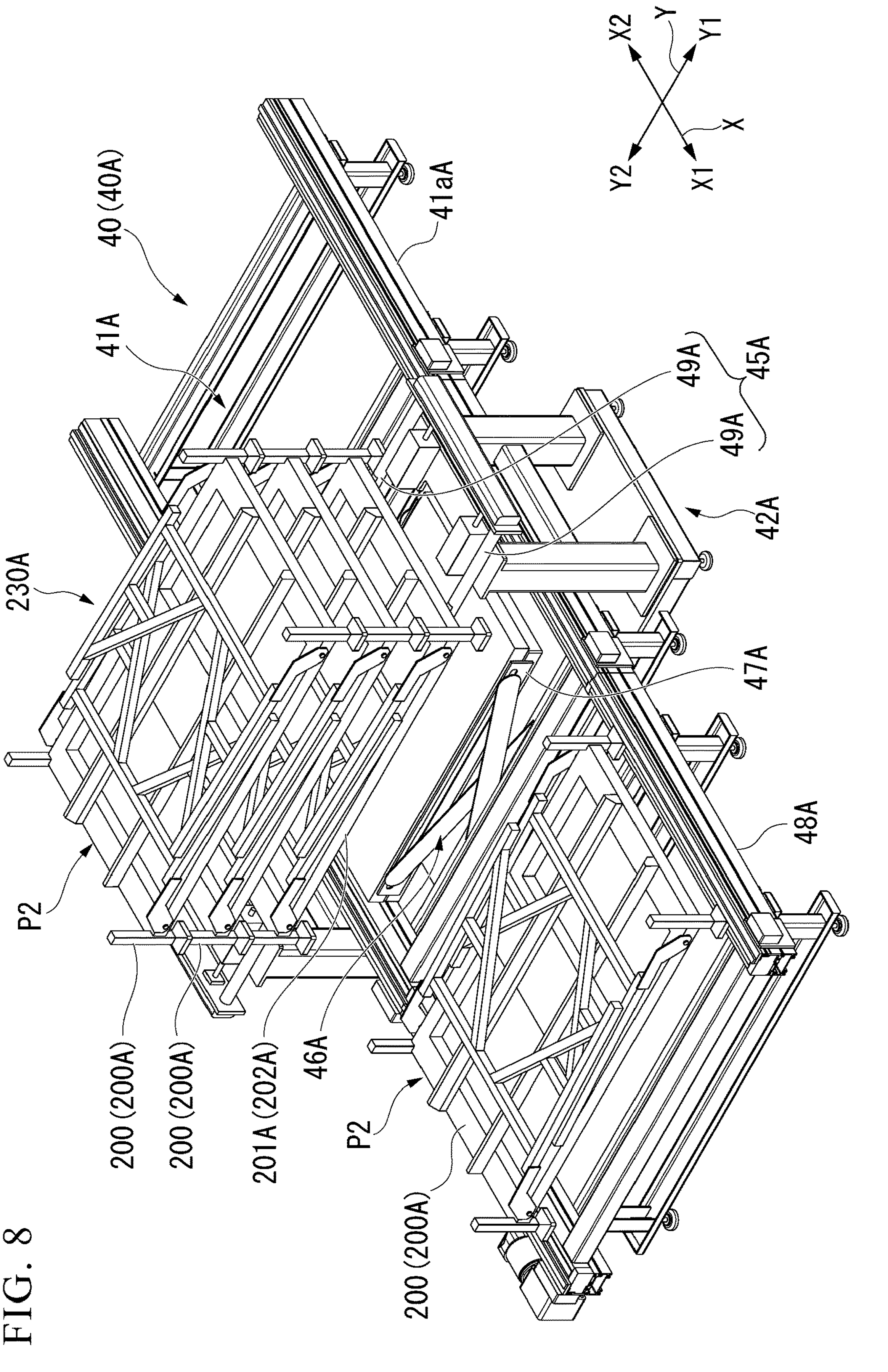
FIG. 8 is an enlarged view of a main part in FIG. 7.
Figure 9:
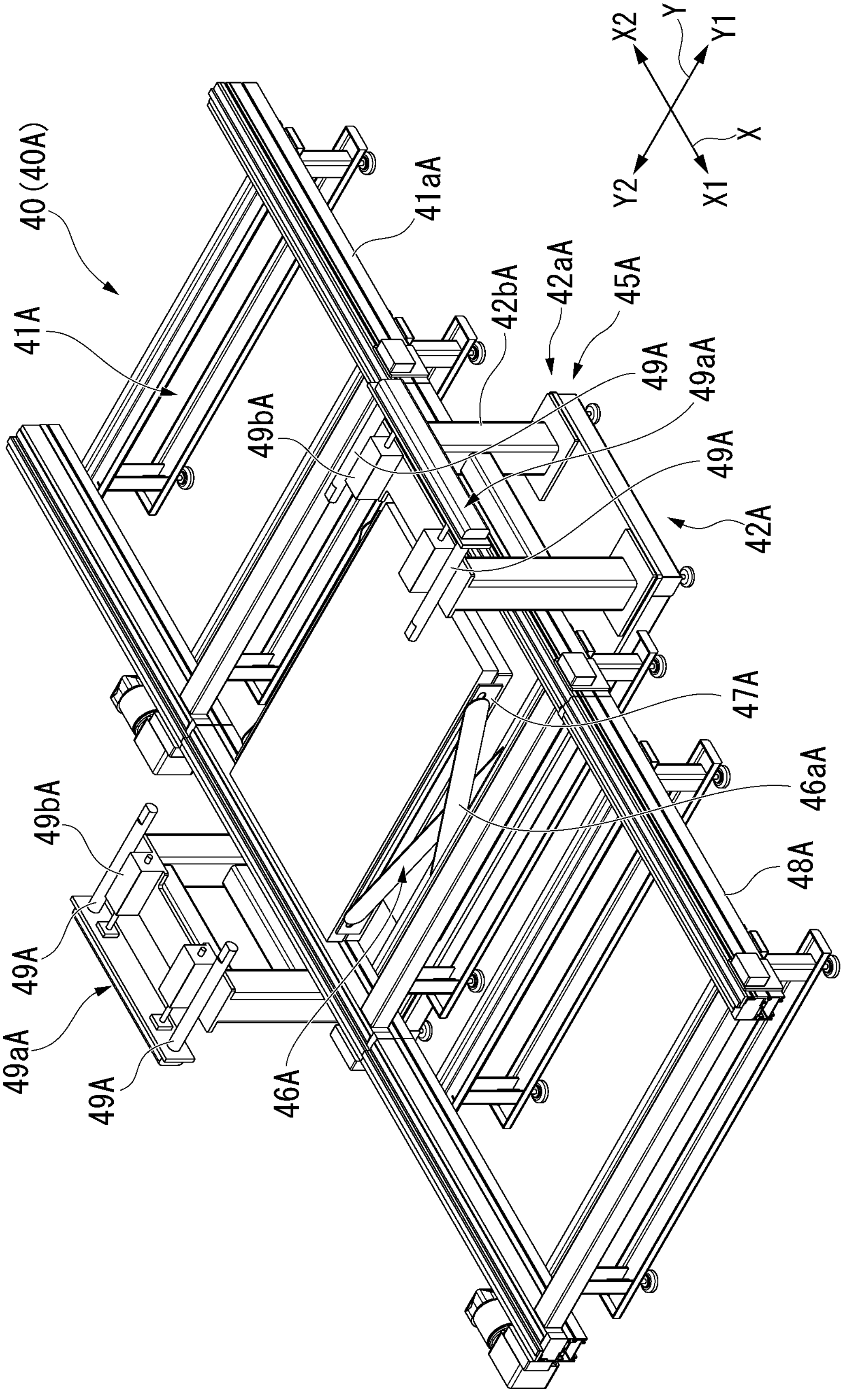
FIG. 9 is a view that does not show the storage rack in FIG. 8.

As shown in FIGS. 8 and 9, the first rack supply section 40A supplies the first storage rack 200A that is in the storage disabled state P2. The first rack supply section 40A has a rack placement portion 41A and a stack separation portion 42A.

The rack placement portion 41A includes a rack transport unit 41*a*A that transports the first storage rack 200A. For example, a known conveyor such as a wheel conveyor is used for the rack transport unit 41*a*A. The rack placement portion 41A includes a placement position provided on the rack transport unit 41*a*A. A plurality of storage racks 200A that are in the storage disabled state P2 are transferred to the rack placement portion 41A in a stacked state by a transport means (not shown) and placed on the rack transport unit 41*a*A. Specifically, the storage rack 200A is placed at the placement position set in the rack transport unit 41*a*A.

Hereinafter, the plurality of storage racks 200A that are stacked and are in the storage disabled state P2 will be referred to as stacked storage racks 230A. In the stacked storage racks 230A, the recess 208*a*A in the support portion 204A of the storage rack 200A arranged above and an upper end portion of the support portion 204A of the storage rack 200A arranged below are fitted to each other to maintain the stacked state.

The rack transport unit 41*a*A transports the stacked storage racks 230A placed at the placement position to the first side X1, which is the transport direction.

The stack separation portion 42A separates one storage rack 200A that is in the storage disabled state P2 from the stacked storage racks 230A and transports the separated storage rack 200A. Specifically, the lowermost storage rack 200A of the stacked storage racks 230A is separated and the separated storage rack 200A is transported in the transport direction. The stack separation portion 42A has a rack separation unit 42*a*A and a rack transport unit 48A.

The rack separation unit 42*a*A includes a rack engaging portion 45A and a rack lifting portion 46A. The rack separation unit 42*a*A also includes a support base member 42*b*A to which the rack engaging portion 45A and the rack lifting portion 46A are fixed and which integrally supports them. The support base member 42*b*A is a plate-like member formed in a rectangular shape.

The rack engaging portion 45A has a pair of rack engaging mechanisms 49*a*A spaced apart by a predetermined distance in the second installation direction Y, which is the width direction orthogonal to the transport direction of the rack transport unit 48A.

The rack engaging mechanisms 49*a*A and 49*a*A are arranged so as to be spaced apart by a predetermined distance in the width direction, and have a pair of engaging portions 49A and 49A that are capable of approaching and separating from each other in the width direction and have driving mechanism portions 49*b*A and 49*b*A that move the pair of engaging portions 49A and 49A backward and forward between an engagement position and a standby position. Each of the pair of engaging portions 49A and 49A is a rod-shaped member extending in the second installation direction Y, which is the width direction. The pair of engaging portions 49A and 49A are arranged so as to be spaced apart from each other in the first installation direction X. The pair of engaging portions 49A, 49A are advanced and moved to below the base portion 202A of the storage rack 200A that is raised by the rack lifting portion 46A by advancing and moving. As a result of the storage rack 200A placed on the lifting portion 46A being moved downward, the storage rack 200A is engaged with and supported by the pair of engaging portions 49A and 49A being on standby below the base portion 202A of the storage rack 200A. More specifically, the pair of engaging portions 49A and 49A advance and move below the base portion 202A of the storage rack 200A that is the second one from the bottom among the stacked storage racks 230A, are on standby in an advanced state, and engage with the base portion 202A of the storage rack 200A that is the second one from the bottom among the stacked storage racks 230A by the rack lifting portion 46A moving downward (see FIG. 5).

The rack lifting portion 46A includes a lifting stage 47A and a rack lifting mechanism 46*a*A that moves the lifting stage 47A up and down. The rack lifting mechanism 46*a*A is, for example, a hydraulic jack. The rack lifting portion 46A abuts on the storage rack 200A in the lowest layer of the stacked storage racks 230A by vertically moving the lifting stage 47A, and places the stacked storage racks 230A thereon and supports them, so that the stacked storage racks 230A are elevated up and down and are stopped and maintained at the separation position.

The lifting stage 47A is arranged lower than the rack engaging portion 45A.

The rack transport unit 48A is configured similarly to the rack transport unit 41*a*A. The rack transport unit 48A transports one storage rack 200A that is in the storage disabled state P2 to the first side X1, which is the conveying direction.

Similarly to the first rack supply section 40A, the second rack supply section 40B supplies the second storage rack 200B. The third rack supply section 40C supplies the third storage rack 200C.

As shown in FIG. 7, the transport device 55 transports the storage rack 200 that is in the storage disabled state P2 from the rack supply section 40 to the rack preparation section 65.

The transport device 55 has a first transport conveyor 56, a second transport conveyor 57 and a third transport conveyor 58. The transport conveyors 56, 57 and 58 are configured similarly to the rack placement portion 41A.

The first transport conveyor 56 is arranged so as to extend in the second installation direction Y, which is a direction orthogonal to the transport direction of the rack supply section 40. The first transport conveyor 56 is arranged on the first side X1 downstream in the transport direction with respect to the rack transport units 48A, 48B, and 48C of the rack supply sections 40A, 40B, and 40C. The first transport conveyor 56 transports each of the storage racks 200A, 200B, and 200C that are in the storage disabled state P2 and transported by the rack transport units 48A, 48B, and 48C of the rack supply sections 40A, 40B, and 40C to the first side Y1.

Also, the first transport conveyor 56 is provided with a first transport assisting unit (reference numeral omitted) that receives the storage racks 200A, 200B, and 200C transported from the respective rack transport units 48A, 48B, and 48C to the respective connections to which the rack transport units 48A, 48B, and 48C are connected, and that places the storage racks on the first transport conveyor 56. In addition, the first transport conveyor 56 is provided with a second transport assisting unit (reference numeral omitted) that transports the storage racks 200 from the first transport conveyor 56 to the second transport conveyor 57 at the connection with the second transport conveyor 57.

The second transport conveyor 57 is arranged at the end portion of the first side Y1 in the transport direction of the first transport conveyor 56 and on the first side X1 in the direction orthogonal to the transport direction of the first transport conveyor 56. The second transport conveyor 57 transports the storage racks 200 to the first side X1 in the transport direction.

The third transport conveyor 58 is disposed on the end portion side of the first side X1 in the transport direction of the second transport conveyor 57. The third transport conveyor 58 transports the storage racks 200 to the second side Y2 being in the direction opposite to the transport direction of the first transport conveyor 56. In addition, the third transport conveyor 58 is provided with a third transport assisting unit (reference numeral omitted) that transports the storage racks 200 transported from the second transport conveyor 57 to the third conveyor 58 at a connection connected to the second transport conveyor 57.

Figure 10:
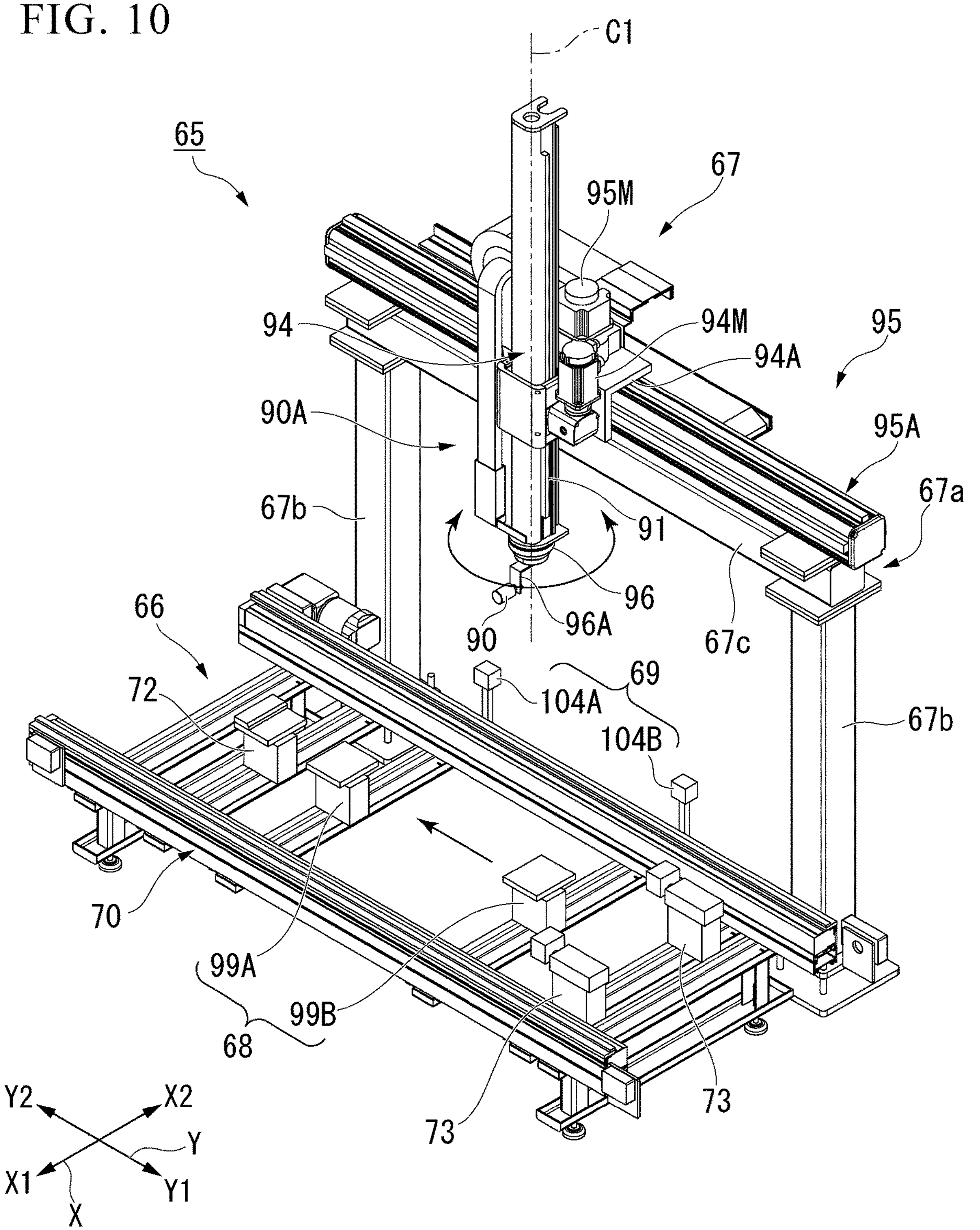
FIG. 10 is a perspective view of a rack preparation section of the same shipment system.
Figure 11:
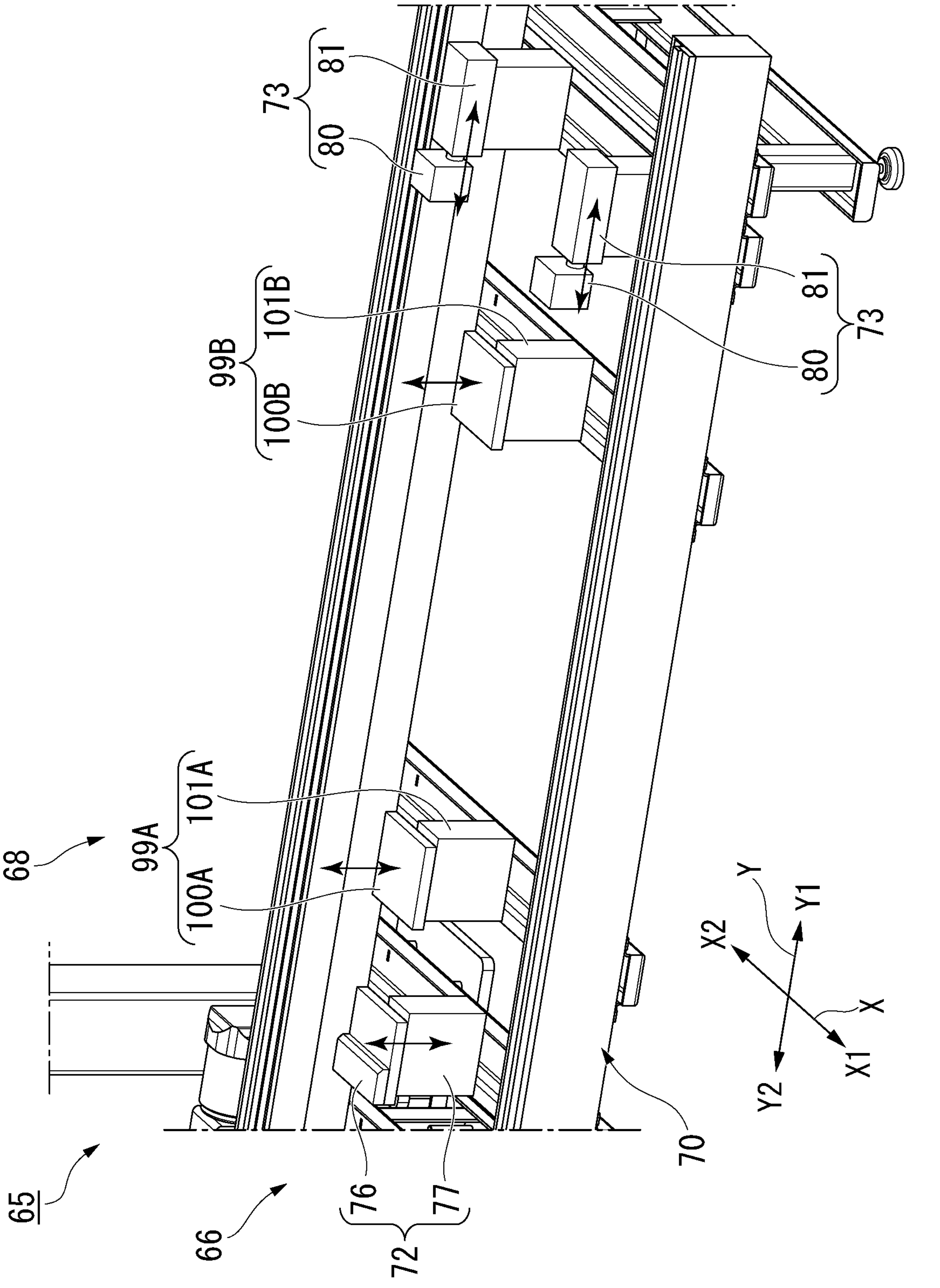
FIG. 11 is an enlarged view of a main part in FIG. 10.

The rack preparation section 65 handles the storage rack 200. The rack preparation section 65 performs a work of changing the state of the storage rack 200 from the storage rack 200 that is in the storage disabled state P2 to the storage rack 200 that is in the storage enabled state P1. As shown in FIGS. 10 and 11, the rack preparation section 65 has a preparation positioning unit 66 and a partition moving unit 67. The rack preparation section 65 also has a movement assisting unit 68 and an upper partition detection portion 69. The rack preparation section 65 also has a preparation transport unit 70 which is provided on the transport path of the third transport conveyor 58 and which transports the storage rack 200 and sets a preparation position for performing preparation work of the storage rack 200.

The preparation positioning unit 66 performs positioning of the storage rack 200 disposed at the preparation position. The preparation positioning unit 66 has a stopping unit 72 and a positioning portion 73.

Figure 12:
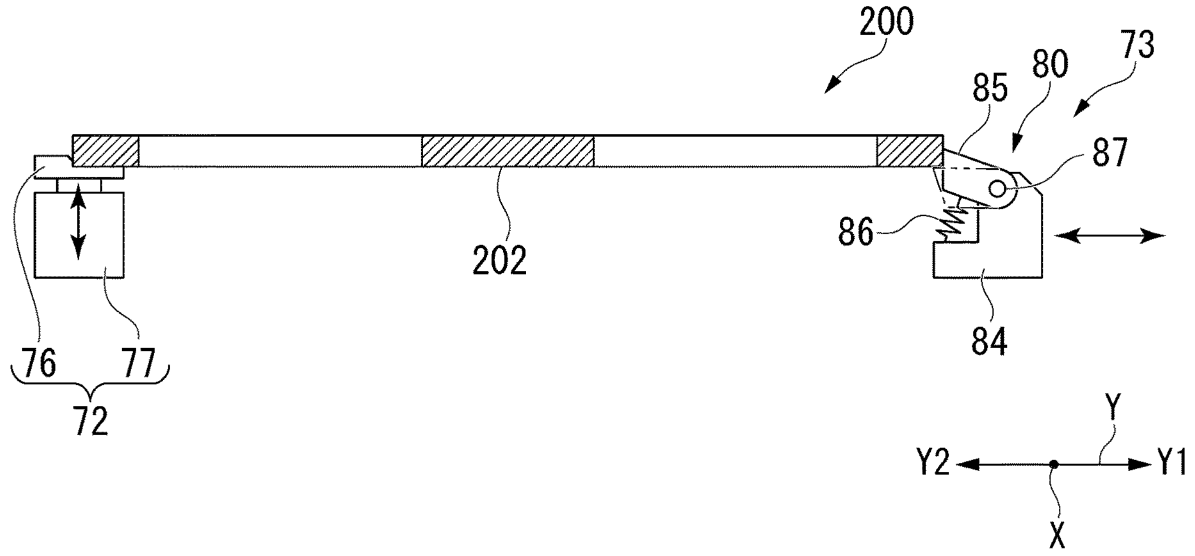
FIG. 12 is a cross-sectional view of a main part of the same rack preparation section.

The stopping unit 72 has a locking portion 76 and a drive portion 77. As shown in FIG. 12, the locking portion 76 engages with one end portion on the second side Y2 (downstream side in the transport direction) that is one side in the base portion 202 of the storage rack 200. The drive portion 77 is an actuator that moves the locking portion 76 vertically. In the present embodiment, the stopping unit 72 is configured such that movement of the locking portion 76 between a locking position above the conveying surface of the storage rack 200 transported by the preparation transport unit 70 and an avoiding position below the conveying surface is made possible by actuation of the drive portion 77. By moving the locking portion 76 to the locking position and being on standby, the storage rack 200 transported by the preparation transport unit 70 is locked to the locking portion 76 and thereby it is possible to stop the storage rack 200 at the preparation position.

As shown in FIG. 11, in the present embodiment, the preparation positioning unit 66 has a pair of positioning portions 73. The pair of positioning portions 73 are disposed so as to be spaced apart from each other in the first installation direction X, which is the width direction orthogonal to the transport direction of the preparation transport unit 70. Further, the positioning portions 73 are arranged on the upstream side in the conveying direction with respect to the stopping unit 72.

In addition, the number of positioning portions 73 included in the preparation positioning unit 66 may be one.

Each positioning portion 73 has a contact portion 80 and a drive portion 81. In addition, in FIG. 10 and FIG. 11, the contact portion 80 is shown in a simplified manner. As shown in FIG. 12, the contact portion 80 has a support portion 84, a contact piece 85, and a biasing member 86.

The contact piece 85 is connected so as to be capable of rotating to the support portion 84 by a shaft member 87 at one end portion of the first side Y1 that is the conveying direction, and provided so as to be capable of swinging at the other end portion of the conveying direction.

The drive portion 81 is an actuator that reciprocates the contact portion 80 in the conveying direction. The drive portion 81 is a pressure cylinder that operates using fluid as a drive source in the present embodiment. The contact portion 80 is moved between a positioning position set on the downstream side in the conveying direction and a standby position set on the upstream side in the conveying direction by the actuation of the drive portion 81.

The biasing member 86 is a spring or the like. The biasing member 86 biases upward the other end portion of the second side Y2 that is in the conveying direction of the contact piece 85. One end of the contact piece 85 is supported below the conveying surface, and the other end is supported by the biasing member 86 so as to be maintained above the conveying surface. An upper surface of the contact piece 85 is supported by the support portion 84 so as to gradually incline upward from the upstream side in the conveying direction toward the second side Y2, which is the downstream side. The contact piece 85 is capable of being engaged with the other end portion of the base portion 202 of the storage rack 200 on the first side Y1 (upstream side in the transport direction), which is the upstream side in the conveying direction.

When the storage rack 200 is transported to the preparation position by the preparation transport unit 70 and the base portion 202 of the storage rack 200 is brought into contact with the contact piece 85, the other end of the second side Y2 of the contact piece 85 on the second side Y2 is gradually moved downward around the shaft member 87 against the biasing force of the biasing member 86 due to the mass of the storage rack 200, and the contact piece 85 is moved to a position below with respect to the conveying surface (the position indicated by the dotted line in FIG. 12). The storage rack 200 is capable of being transported while the base portion 202 passes over the contact piece 85 of the positioning portion 73 to the second side Y2.

When the contact piece 85 has completely passed over the base portion 202 of the storage rack 200 and a resistance force exerted downward with respect to the conveying surface by the storage rack 200 is released, the other end portion of the contact piece 85 on the second side Y2 moves upward with the shaft member 87 as a fulcrum by a biasing force of the biasing member 86, and the other end portion of the contact piece 85 moves above with respect to the conveying surface. The contact piece 85 is moved from the standby position on the upstream side in the conveying direction toward the downstream side in the conveying direction by an operation of the drive portion 81 thereby bringing it into contact with the other end portion of the base portion 202 of the storage rack 200 on the first side Y1 that is the upstream side in the conveying direction, and the base portion 202 is pressed to the downstream side in the conveying direction.

In the storage rack 200, the contact portion 80 including the contact piece 85 in contact with the base portion 202 continues pressing to the downstream side in the conveying direction by an operating force of the drive portion 81, so that the base portion 202 is pressed against the locking portion 76 of the stopping unit 72. Then, the storage rack 200 is positioned and held at the preparation position by the stopping unit 72 and the positioning portion 73.

As shown in FIG. 10, the partition moving unit 67 is supported by a support member 67*a* having a predetermined height. The support member 67*a* includes two support bodies 67*b* and 67*b* and a beam member 67*c* supported across the two support bodies 67*b* and 67*b*.

The two support bodies 67*b* and 67*b* are provided on lateral portions of the preparation transport unit 70 so as to be spaced apart in the conveying direction and the extending-arrangement direction of the beam member 67*c* is disposed so as to be parallel to the conveying direction of the preparation transport unit 70.

The partition moving unit 67 includes an engaging portion 90 that engages with the first engaged portion (engaged portion) 211*a* and the second engaged portion (engaged portion) 221*a* set in the first partition portion 211 and the second partition portion 221 (FIG. 3), and an engagement moving mechanism 90A for moving the engaging portion 90.

The engaging portion 90 is a rod-shaped member having a predetermined length and diameter. The engaging portion 90 is provided at a lower end portion of the first moving support member 91 extending in the vertical direction so that a central axis extends in the horizontal direction (direction along the horizontal plane), and is supported by the engagement moving mechanism 90A so as to be capable of rotating about the central axis.

The engagement moving mechanism 90A has a first moving mechanism 94, a second moving mechanism 95, and an engagement position moving mechanism 96.

The first moving mechanism 94 includes a first moving support member 91 having a predetermined length in the vertical direction, and a first drive motor 94M for moving the first moving support member 91 in the vertical direction.

The second moving mechanism 95 includes a fixed support member 95A having a predetermined length in the horizontal direction, a second moving support member 94A movable along a guide rail provided on the fixed support member 95A, and a second drive motor 95M fixed to the second moving support member 94A and for moving the second moving support member 94A.

The fixed support member 95A is supported by the beam member 67*c*. Further, the second moving support member 94A supports the first moving support member 91 so as to be vertically movable.

Figure 13:
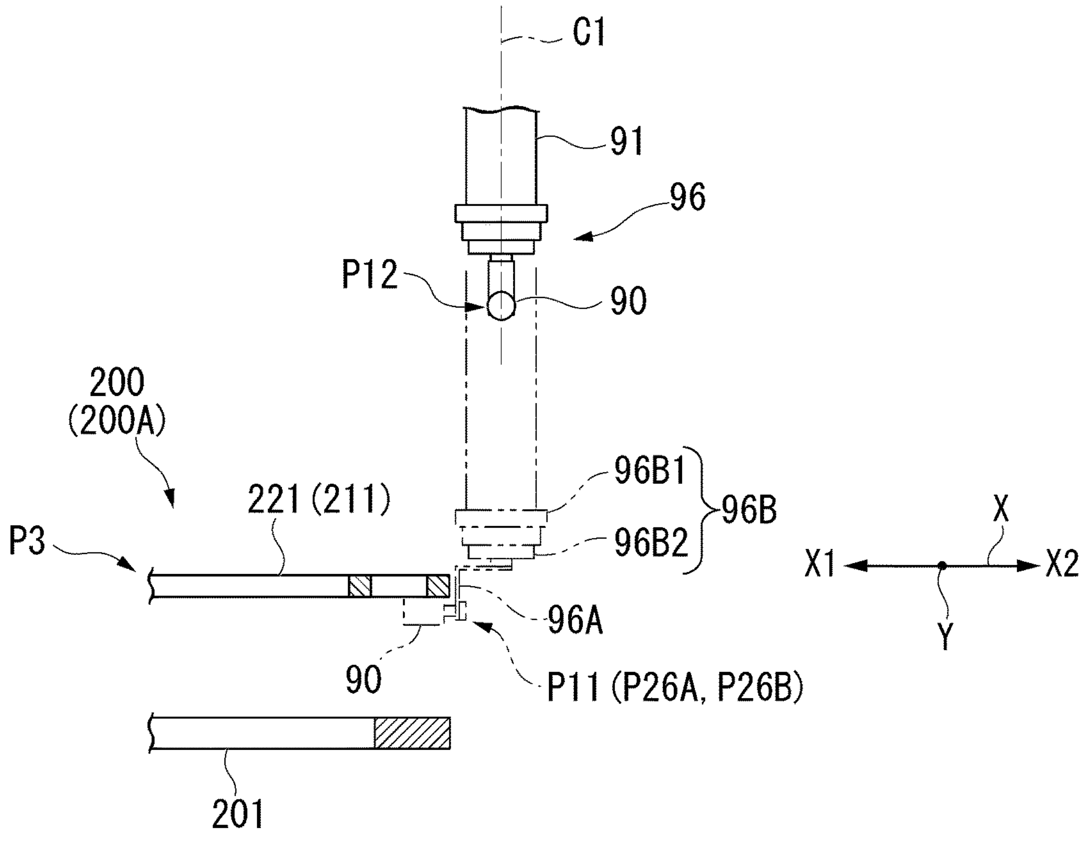
FIG. 13 is a diagram showing an outline of an operation of the same rack preparation section.

As shown in FIG. 13, the engagement position moving mechanism 96 includes an engagement support member 96A that supports the engaging portion 90 so as to be capable of rotating, and an engagement position changing mechanism 96B that moves the engagement support member 96A between an engagement position P11 and a non-engagement position P12.

The engagement support member 96A is an L-shaped member. In the engagement support member 96A, one portion arranged so as to horizontally extend is fixed to the engagement position changing mechanism 96B, and the engaging portion 90 is attached so as to be capable of rotating to the other portion arranged so as to vertically extend.

The engagement position changing mechanism 96B includes a changing fixing portion 96B1 fixed to the first moving support member 91, and a changing moving portion 96B2 which is movably supported with respect to the changing fixing portion 96B1 and to which the engaging support member 96A is fixed. The changing moving portion 96B2 is driven by a driving motor (not shown). The engagement position changing mechanism 96B in the present embodiment employs a rotation mechanism that rotates the change moving portion 96B2 to change the position. The engagement position changing mechanism 96B supports the changing moving portion 96B2 so as to be capable of rotating with respect to the changing fixed portion 96B1.

In the engagement position P11 and the non-engagement position P12, which are the postures of the engaging portion 90, a position around the axis C1 of the first moving support member 91 in the engaging portion 90 and an extension direction of the central axis of the engaging portion 90 are different. The engagement position moving mechanism 96 rotates the engaging portion 90 around the axis C1.

The engaging portion 90 at the engagement position P11 is arranged in an extended state on the first side X1 in the first installation direction X, which is in the width direction orthogonal to the conveying direction of the preparation transport unit 70 and within a range of the conveying movement track of the storage rack 200, and is capable of being engaged with the partition portions 211 and 221. The engagement position P11 is set as the first engagement position P26A at a position corresponding to the engaged position of one partition portion, and is set as the second engagement position P26B at a position corresponding to the engaged position of the other partition portion. The engaging portion 90 at the non-engagement position P12 is arranged in a state extending in the second installation direction Y, which is parallel to the conveying direction of the preparation transport unit 70 and outside the range of the conveying movement track of the storage rack 200, and is disabled from being engaged with the partition portions 211 and 221 of the storage rack 200.

The engagement position moving mechanism 96 disposes the engaging portion 90 at the non-engagement position P12 in advance.

As shown in FIG. 11, the rack preparation section 65 has, as the movement assisting units 68, a first movement assisting unit 99A and a second movement assisting unit 99B. The first movement assisting unit 99A is arranged on the second side Y2 (the downstream side in the transportation direction of the preparation transportation unit 70) with respect to the second movement assisting unit 99B.

In addition, the second movement assisting unit 99B is arranged on the first side Y1 (the upstream side in the transport direction of the preparation transport unit 70) with respect to the first movement assisting unit 99A. The first movement assisting unit 99A and the second movement assisting unit 99B in the present embodiment are arranged between the stopping unit 72 and the positioning portion 73. Specifically, the first movement assisting unit 99A is arranged on the stopping unit 72 side, and the second movement assisting unit 99B is arranged on the positioning portion 73 side.

The first movement assisting unit 99A has a first assisting engagement portion (assisting engagement portion) 100A and a first drive portion 101A. The first assisting engagement portion 100A is a member that is formed in a flat plate shape and has a flat portion, and the flat portion is arranged along a horizontal plane. The first assisting engagement portion 100A is arranged inside a penetration opening 202*c*A of the base portion 202 of the storage rack 200 that performed positioning by the preparation positioning unit 66, passes between the pair of mounting members 206A, and is arranged so as to be movable between a first assisting standby position below the conveying surface and a first assisting engagement position above the conveying surface. The first assisting engagement portion 100A moves the first partition portion 211 that is in the storage disabled state P2 to the first assisting standby position.

The first drive portion 101A moves the first assisting engagement portion 100A in the vertical direction.

The second movement assisting unit 99B has a second assisting engagement portion 100B and a second drive portion 101B. The second assisting engagement portion 100B is a member formed in a flat plate shape and provided with a flat portion, and the flat portion is arranged along a horizontal plane. The second assisting engagement portion 100B is arranged inside the penetration opening 202*c*A of the base portion 202 of the storage rack 200 positioned by the second preparation positioning unit 66, passes between the pair of mounting members 206A, and is arranged so as to be movable between a second assisting standby position below the conveying surface and a second assisting engagement position above the conveying surface. The second assisting engagement portion 100B moves the second partition portion 221 that is in the storage disabled state P2 to the second assisting standby position.

The second drive portion 101B moves the second assisting engagement portion 100B vertically.

Figure 5:
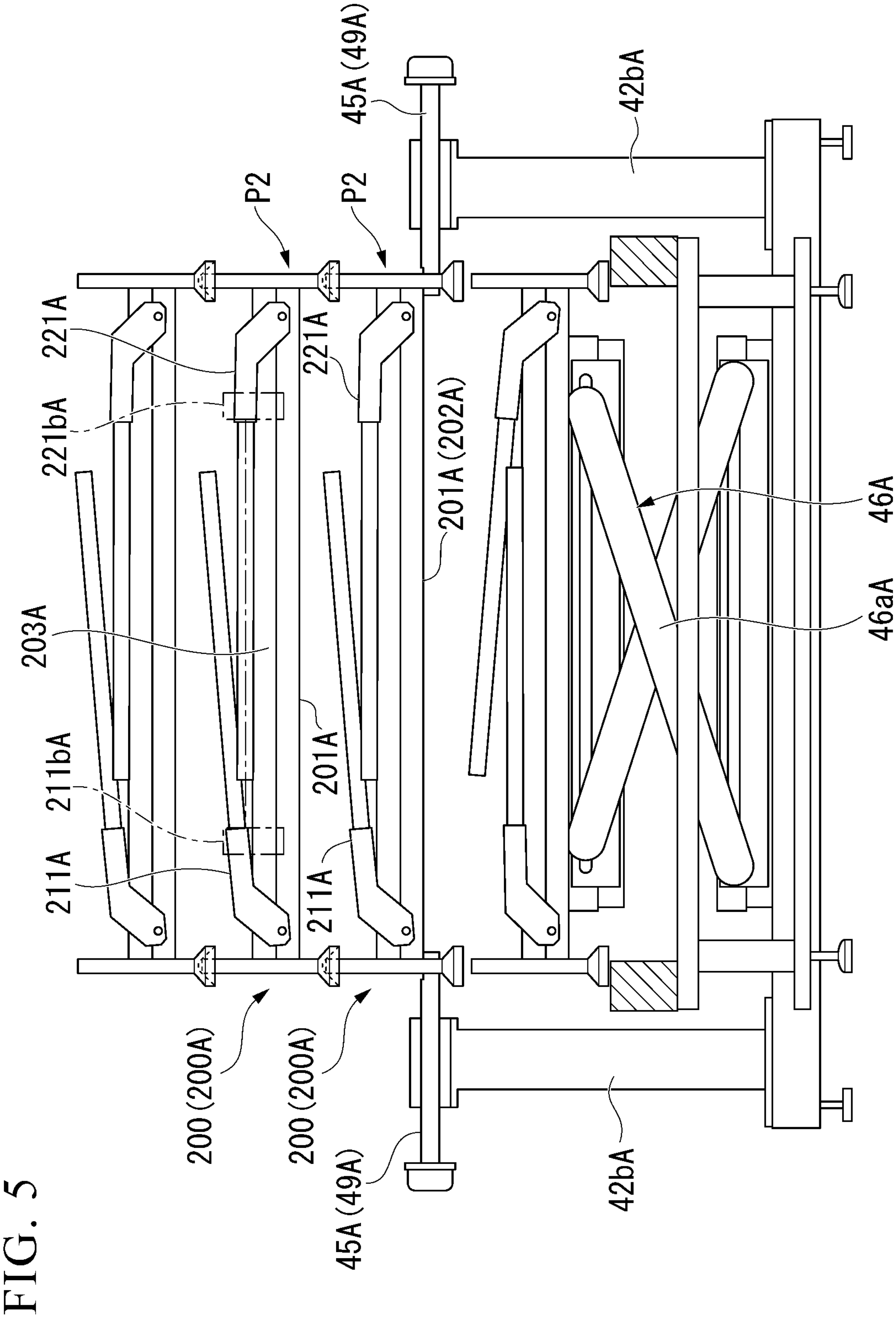
FIG. 5 is a side view of the same storage rack in a storage disabled state.

As shown in FIG. 10, for example, the upper partition detection portion 69 has a first detection portion 104A and a second detection portion 104B. The upper partition detection portion 69 detects the partition portion positioned above from the first partition portion 211 and the second partition portion 221. The detection portions 104A and 104B are proximity sensors, laser sensors, or the like. The first detection portion 104A and the second detection portion 104B are arranged between the stopping unit 72 and the positioning portion 73 and at predetermined positions above the conveying surface. As shown in FIG. 5, for example, in the storage rack 200 that is in the storage disabled state P2, the storage rack 200 of the present embodiment employs the storage rack 200 in a state such that one of the first partition portion 211 and the second partition portion 221 is arranged on a lower side and the other thereof is arranged on an upper side so as to overlap. In the present embodiment, a case will be described in which the first partition portion 211 is arranged above the second partition portion 221 so as to overlap thereon.

In a region 211*b* at a base end side in the first partition portion 211 arranged above, a large gap is likely to be formed between the mounting portion 203 and the first partition portion 211. In a region 221*b* at a base end side in the second partition portion 221 arranged below, a gap is less likely to be formed between the mounting portion 203 and the second partition portion 221. Also, the second partition portion 221 arranged below is arranged at a certain position from the mounting portion 203.

The first detection portion 104A is arranged at a downstream side of the conveying direction, and detects a state of one of the first partition portion 211 and the second partition portion 221 arranged on a downstream side in the conveying direction. In the present embodiment, when the first partition portion 211 is arranged at the downstream side of the conveying direction and the first partition portion 211 is arranged in a state of overlapping above the second partition portion 221, the first detection portion 104A detects a gap formed between the mounting portion 203 and the first partition portion 211.

The second detection portion 104B is arranged on the upstream side in the conveying direction and detects the state of the other of the first partition portion 211 and the second partition portion 221 arranged on the upstream side in the conveying direction. In the present embodiment, when the second partition portion 221 is arranged at the upstream side in the conveying direction and the first partition portion 211 is arranged in a state of overlapping above the second partition portion 221, the second detection portion 104B detects the second partition portion 221.

The rack unloading section 110 unloads the storage rack 200 that is in the storage enabled state P1 from the rack preparation section 65. As shown in FIG. 7, the rack unloading section 110 has an unloading transport unit 110A that is provided on the transport path of the third transport conveyor 58 and transports the storage rack 200. As shown in FIG. 7, a known roller conveyor is used for the unloading transport unit 110A. The rack unloading section 110 is arranged on the second side Y2, which is downstream in the conveying direction with respect to the rack preparation section 65. The rack unloading section 110 cooperates with the preparation transport unit 70 of the rack preparation section 65 to transport the storage rack 200 that is in the storage enabled state P1 to the second side Y2, which is the downstream side in the conveying direction.

Figure 14:
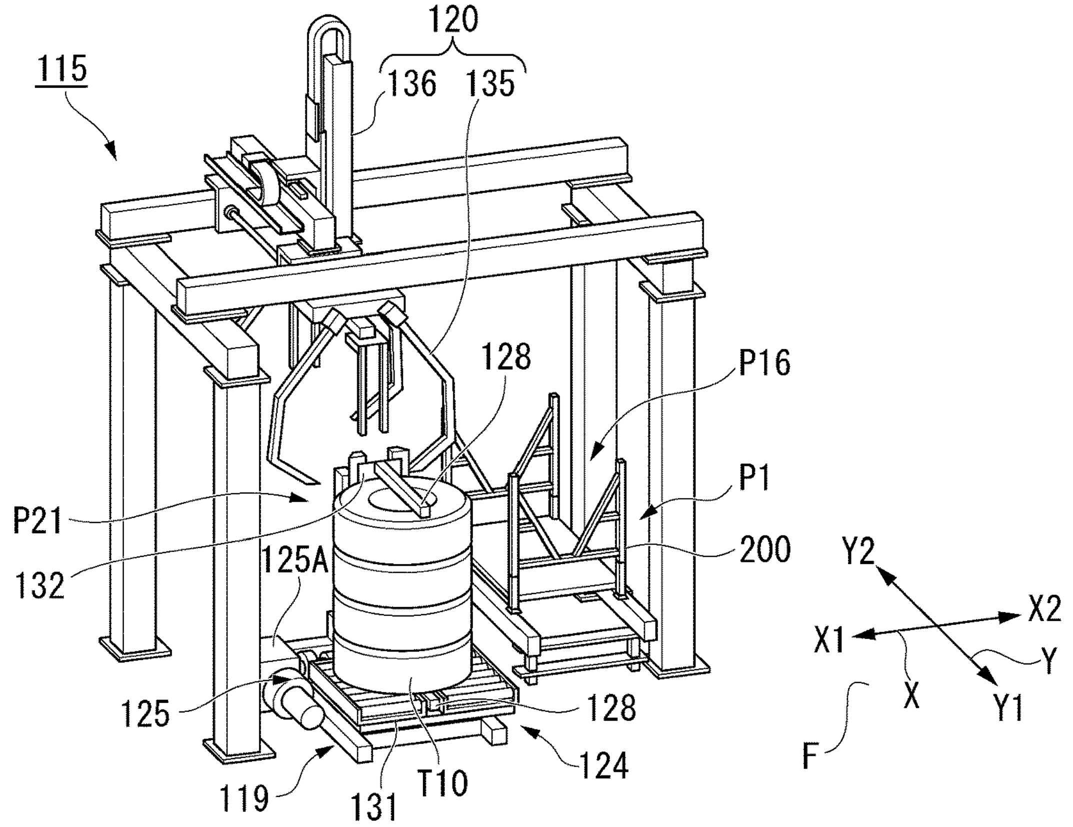
FIG. 14 is a perspective view of a storage section of the same shipment system.

As shown in FIGS. 7 and 14, the storage section 115 stores the stacked tires T10 (tires T) in the storage rack 200 that is in the storage enabled state P1. The storage section 115 has a storage positioning unit 116, a storage transport unit 118, a storage object positioning unit (posture changing unit) 119, and a storage transfer unit 120. The storage section 115 also includes a storage section rack transport unit 123 that transports the storage rack 200 that is in the storage enabled state P1. The storage section 115 also includes a storage information acquisition portion 121 that acquires information on the tire T.

The storage positioning unit 116 performs positioning of the storage rack 200 that is in the storage enabled state P1 at a storage position P16 that performs storing work of the stacked tires T10.

The storage positioning unit 116 has a positioning unit (not shown).

The storage section rack transport unit 123 is arranged on the second side Y2 that is the conveying direction with respect to the rack unloading section 110. The storage section rack transport unit 123 transports the storage rack 200 that is in the storage enabled state P1 to the second side Y2 that is the conveying direction. For example, the positioning unit is configured similarly to the preparation positioning unit 66 described above. The positioning unit performs positioning of the storage rack 200 that is in the storage enabled state P1 at the storage position P16.

The storage preparation transport unit 117 is arranged on the downstream side of a second rotation-transport base 32 and performs relay transport of transporting the stacked tires T10 transported from the second rotation-transport base 32 to the storage transport unit 118. For example, a known roller conveyor is used for the storage preparation transport unit 117.

The storage transport unit 118 transports the stacked tires T10 to the storage object positioning unit 119. The storage transport unit 118 is configured similarly to the first rotation-transport base 26. The storage transport unit 118 is arranged on the second side X2 with respect to the storage preparation transport unit 117. The storage transport unit 118 cooperates with the storage preparation transport unit 117 to transport the stacked tires T10. The storage transport unit 118 changes the posture of the stacked tires T10, transports the stacked tires T10 to the second side Y2, and sends them to the storage object positioning unit 119.

The storage object positioning unit 119 performs positioning of the stacked tires T10 before being stored, at an unloading position P18 where unloading work of the stacked tires T10 is performed.

As shown in FIG. 14, the posture changing unit 119 as a storage object positioning unit has a posture transport unit 119A (see FIG. 7), a holding mechanism 124, and a posture changing mechanism 125.

As shown in FIG. 7, the posture transport unit 119A uses a known roller conveyor. The posture transport unit 119A is arranged adjacent to the downstream side (second side Y2) of the storage transport unit 118 in the conveying direction. In the posture transport unit 119A, a pair of roller conveyors 119Aa are arranged so as to be spaced apart from each other by a predetermined interval in a width direction orthogonal to the conveying direction. The pair of roller conveyors 119Aa transport the stacked tires T10 at the same speed. The posture transport unit 119A cooperates with the storage transport unit 118 to transport the stacked tires T10 in the conveying direction.

As shown in FIG. 14, the holding mechanism 124 has a pair of holding members 128 and a holding-moving mechanism (not shown) that moves the pair of holding members 128. The pair of holding members 128 are bar-shaped members having a predetermined length extending along a direction intersecting the stacking direction of the stacked tires T10 to be held, and are arranged so as to be spaced apart from each other in the stacking direction. The holding-moving mechanism moves the pair of holding members 128 so that the pair of holding members 128 approach each other. The pair of holding members 128 and 128 are arranged so as to sandwich the stacked tires T10 by respectively moving from one side and the other side in the stacking direction. The holding mechanism 124 holds the stacked tires T10 between the pair of holding members 128 in the stacking direction.

The posture changing mechanism 125 has a support base 131, a moving base 132, and a drive unit 125A. The support base 131 is arranged on the installation surface F. As shown in FIG. 14 and subsequent figures, the pair of conveying rollers of the support base 131 are shown in a simplified manner. In addition, a standby position P17 where the stacked tires T10, which are before changing their posture and are held by the pair of holding members 128, are standby is set in the support base 131.

A moving base 132 extends upward from the support base 131. A lower end portion of the moving base 132 is supported by the support base 131 and an upper end portion thereof is configured to be movable in a predetermined angular range around the lower end portion side. The drive unit 125A moves the moving base 132, and a drive motor is employed in the present embodiment. The moving base 132 is movable between a raising state P21, which raises in a vertical state with respect to the support base 131, and a tilted state P22, which becomes a horizontal state extending along the horizontal plane from the support base 131 shown in FIG. 15, and is moved by the drive unit 125A. The holding mechanism 124 is attached to the moving base 132 so that the moving direction of the pair of holding members 128 and the extending-arrangement direction of the moving base 132 are the same.

The posture changing mechanism 125 changes the posture of the stacked tires T10 held by the holding mechanism 124 by moving the holding mechanism 124 to a predetermined angle. The posture changing unit 119 as a storage object positioning unit changes the posture of the stacked tires T10 from a posture in which the stacking direction is along the vertical direction to a posture in which the stacking direction becomes along the horizontal direction.

A position of the stacked tires T10 when the moving base 132 is in the tilted state P22 is the unloading position P18.

As shown in FIG. 14, the storage transfer unit 120 has a storage holding portion 135 and a three-axis moving mechanism 136.

The storage holding portion 135 holds the stacked tires T10 whose stacking direction has been changed to the horizontal direction, and releases this holding. The three-axis moving mechanism 136 moves the storage holding portion 135 in the vertical direction, the first installation direction X, and the second installation direction Y. The storage transfer unit 120 moves the storage holding portion 135 between the storage position P16 and the unloading position P18, and transfers the stacked tires T10 to the storage rack 200 that is in the storage enabled state P1.

In addition, as a moving mechanism for moving the storage holding portion 135, the storage transfer unit 120 can be a moving mechanism that moves the storage holding portion 135 between the storage position P16 and the unloading position P18 to transfer the stacked tires T10 to the storage rack 200 that is in the storage enabled state P1. As the moving mechanism of this embodiment, a three-axis moving mechanism is adopted so that the movement of each storage holding portion 135 is orthogonal to the others, but other moving mechanisms may be used, for example, a robot having a multi-joint moving mechanism is adopted.

The storage information acquisition portion 121 is a sensor that reads the tire code T6, as shown in FIG. 7. As a sensor for reading the tire code T6, a two-dimensional reader, an IC reader, or the like is employed. The storage information acquisition portion 121 is arranged on a side of the second rotation-transport base 32. The storage information acquisition portion 121 acquires tire information from the stacked tires T10 on the second rotation-transport base 32.

The controller 140 controls an operation of the partition moving unit 67 and management of the shipment system 1 including the storage rack supply system 2. The controller 140 identifies a type and size of the tire T based on the tire information acquired by the storage information acquisition portion 121, determines the rack supply section 40 corresponding to the storage rack 200 suitable for storing the identified tire, and controls the transport of the storage rack 200 from the rack supply section 40 that has been determined.

Figure 16:
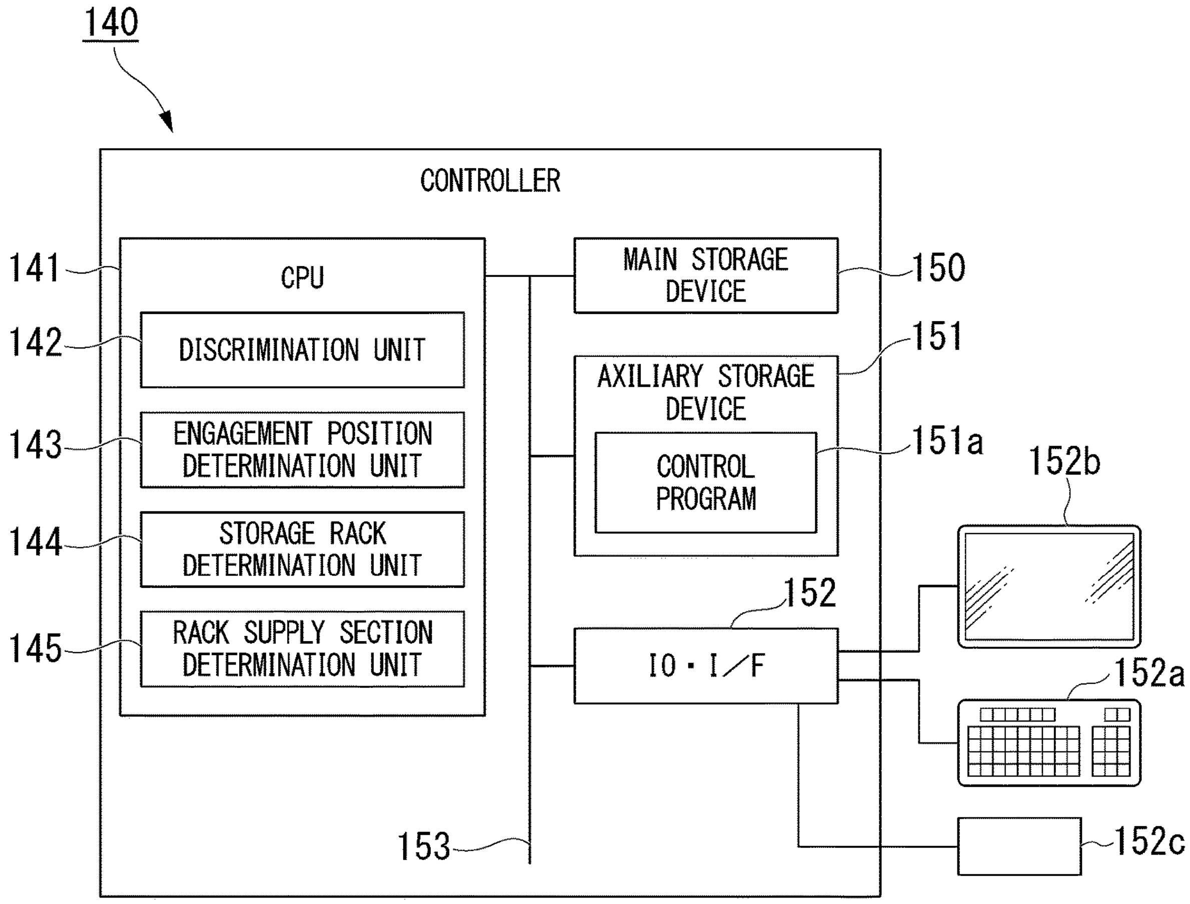
FIG. 16 is a diagram showing an outline of a controller of the same shipment system.

As shown in FIG. 16, a computer is used as the controller 140, for example. The controller 140 includes a CPU (Central Processing Unit) 141, a main storage device 150, an auxiliary storage device 151, and an input-output interface (IO-I/F) 152. The CPU 141, the main storage device 150, the auxiliary storage device 151 and input-output interface 152 are connected to each other by a bus 153.

The main storage device 150 is a RAM (Random-Access Memory) or the like that serves as a work area or the like for the CPU 141.

The input-output interface 152 is connected to an input device 152*a* such as a keyboard and a mouse, a display device 152*b* such as a monitor, and an input-output device 152*c* such as a sensor, a button, a motor, and a solenoid valve.

The auxiliary storage device 151 is a hard-disk drive device or the like that stores various data, programs, and the like. The auxiliary storage device 151 stores a control program 151*a* for causing the CPU 141 to function as a discrimination unit 142, an engagement position determination unit 143, a storage rack determination unit 144, and a rack supply section determination unit 145, and various programs such as OS programs.

The CPU 141 executes various arithmetic processing. The CPU 141 functionally has the discrimination unit 142, the engagement position determination unit 143, a storage rack determination unit 144, and a rack supply section determination unit 145. The discrimination unit 142, the engagement position determination unit 143, the storage rack determination unit 144, and the rack supply section determination unit 145, which are functional components of the CPU 141, are operated by the CPU 141 executing the control program 151*a* stored in the auxiliary storage device 151.

Based on a detection result of the upper partition detection portion 69, the discrimination unit 142 discriminates which of the first partition portion 211 and the second partition portion 221 that are in the storage disabled state P2 with respect to the base portion 202 is positioned above.

Based on the discrimination result of the discrimination unit 142, the engagement position determination unit 143 determines the first engagement position with respect to the first engaged portion 211*a* or the second engagement position with respect to the second engaged portion 221*a* at which the engaging portion 90 of the rack preparation section 65 is engaged.

The storage rack determination unit 144 determines the rack supply sections 40A, 40B, and 40C on which the storage racks 200 corresponding to the type and size of the tire T are placed based on the tire information.

The rack supply section determination unit 145 selects the rack supply sections 40A, 40B, and 40C to which the storage racks 200 determined by the storage rack determination unit 144 are supplied.

Next, an operation of the shipment system 1 configured as described above will be described with an emphasis on the rack preparation section 65 and the storage section 115.

Figure 17:
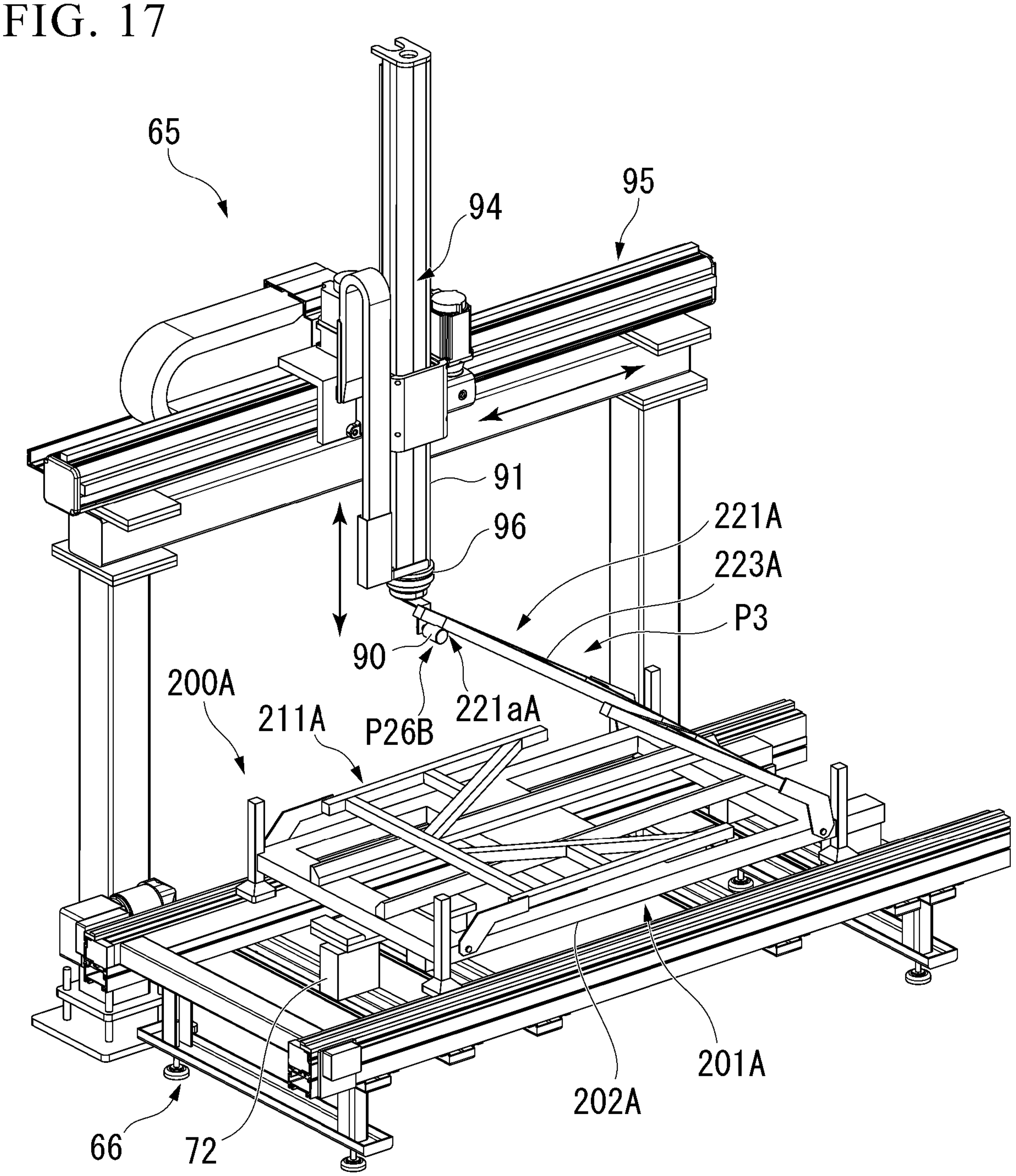
FIG. 17 is a perspective view explaining an operation of the same rack preparation section.

For example, in the storage rack 200 being in the storage disabled state P2, which is transported to the rack preparation section 65 and has performed positioning, when the upper partition detection portion 69 detects the second partition portion 221 positioned above from the first partition portion 211 and the second partition portion 221, the discrimination unit 142 discriminates that the second partition portion 221 is positioned above. As shown in FIG. 17, in the storage rack 200 that is in the storage disabled state P2 of the rack preparation section 65, the first partition portion 211 is arranged on the downstream side in the conveying direction, and the second partition portion 221 is arranged on the upstream side in the conveying direction and positioning is performed.

Figure 18:
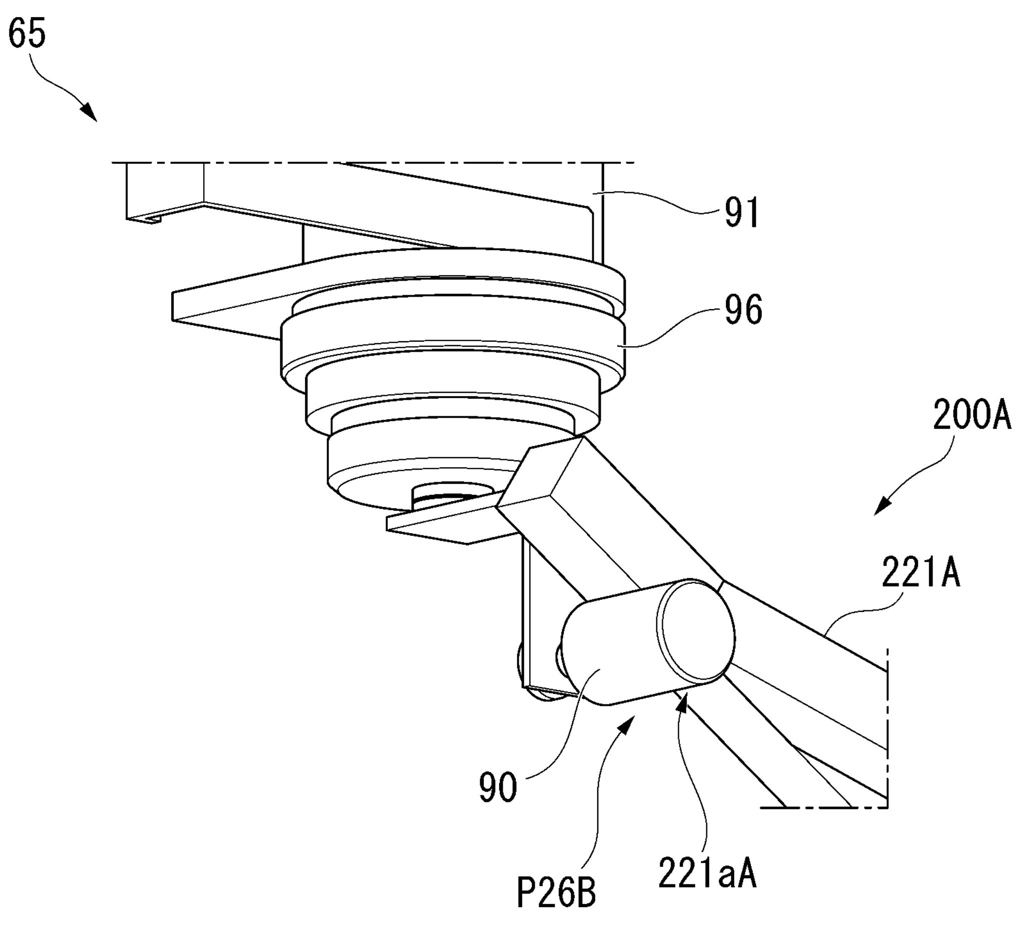
FIG. 18 is an enlarged perspective view of a main part in FIG. 17.

As shown in FIGS. 6, 17 and 18, the engagement position determination unit 143 operates the second movement assisting unit 99B corresponding to the second partition portion 221 based on the discrimination result of the discrimination unit 142, and the second partition portion 221 is moved to the intermediate position P3. The intermediate position P3 is specifically a position above the second movement assisting unit 99B, and is set as a second intermediate position P3B.

Further, the engagement position determination unit 143 determines a second engagement position P26B with respect to the second engaged portion 221*a* as the engagement position P11 at which the engaging portion 90 of the partition moving unit 67 is engaged.

As shown in FIG. 13, the controller 140 operates the first moving mechanism 94 by controlling the partition moving unit 67 to move downward the engaging portion 90 that is present at the non-engagement position P12. When the height of the engaging portion 90 reaches a position between the bottom portion 201 of the storage rack 200 and the second partition portion 221 that is present at the intermediate position P3, the controller 140 operates the engagement position moving mechanism 96. The engaging portion 90 is moved around the axis C1 of the first moving support member 91 by the operation of the engagement position moving mechanism 96, and moves to the engagement position P11 (first engagement position P26A), thereby being arranged at a lower position of the second partition portion 221 that is present at the intermediate position P3. Next, the first moving mechanism 94 is operated to move the engaging portion 90 upward. The engaging portion 90 engages with the second engaged portion 221*a* of the second partition portion 221 on the way being moved upward. Also, the second moving mechanism 95 is operated to appropriately move the engaging portion 90 in the second installation direction Y, thereby raising the second partition portion 221 with respect to the base portion 202.

Next, the controller 140 operates the first movement assisting unit 99A corresponding to the first partition portion 211 to move the first partition portion 211 to the intermediate position P3. The intermediate position P3 is specifically a position above the first movement assisting unit 99A, and is set as a first intermediate position P3A. The controller 140 determines a first engagement position P26A with respect to the first engaged portion 211*a* as the engagement position P11 at which the engaging portion 90 of the partition moving unit 67 is engaged. The controller 140 operates the first moving mechanism 94 and the second moving mechanism 95 to move the engaging portion 90 in the same manner as the second partition portion 221, thereby raising the first partition portion 211 with respect to the base portion 202. Then, as shown in FIG. 3, the first storage rack 200 is switched to the storage enabled state P1.

Figure 15:
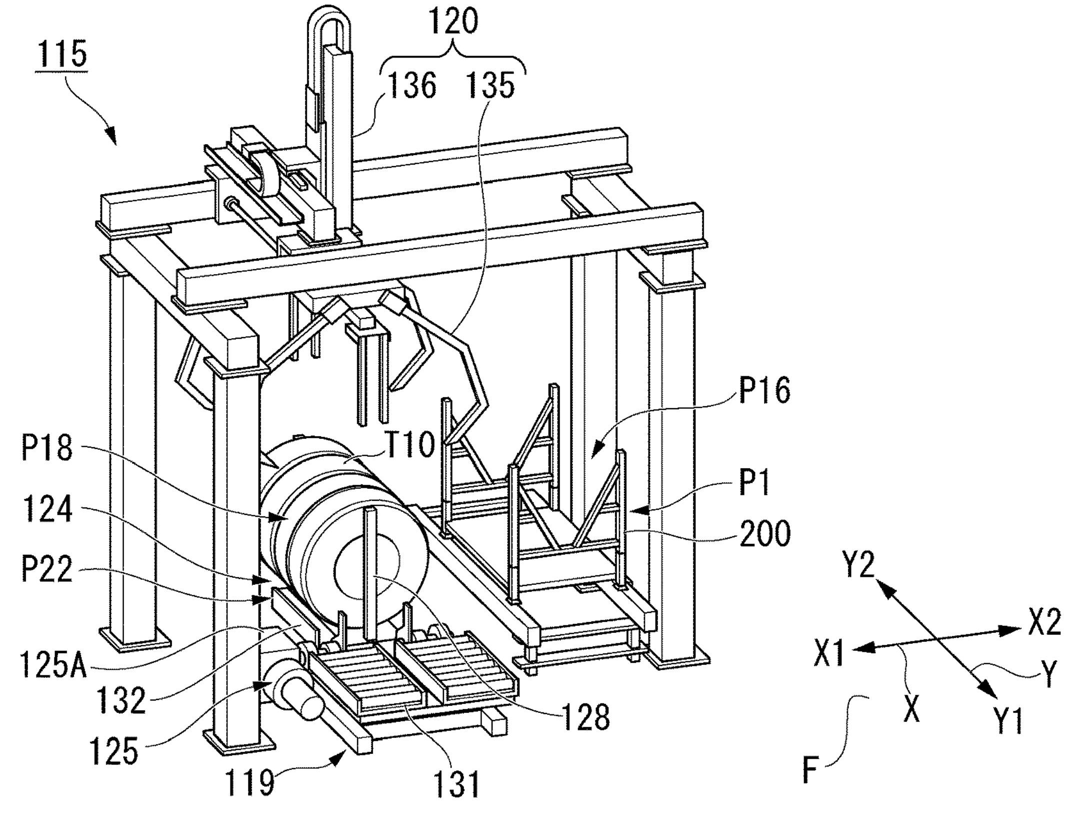
FIG. 15 is a perspective view explaining an operation of the same storage section.
Figure 19:
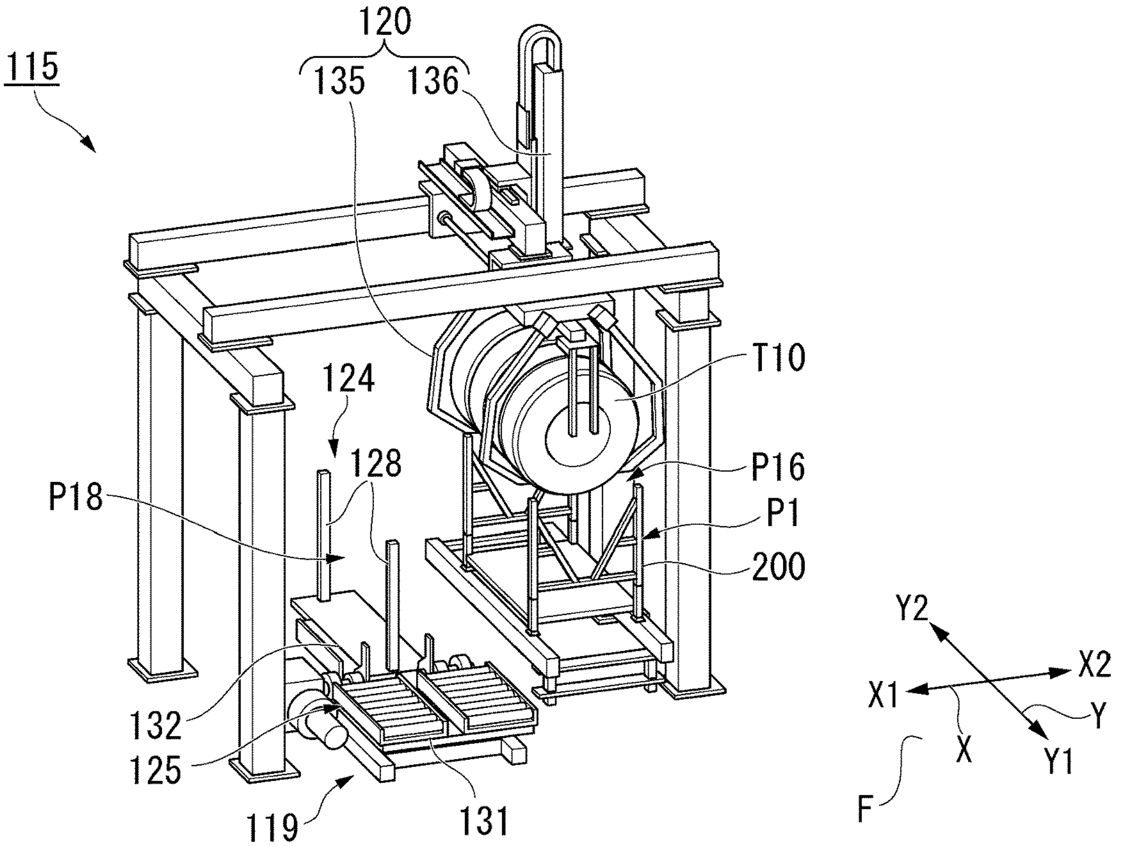
FIG. 19 is a perspective view explaining an operation of the same rack preparation section.
Figure 20:
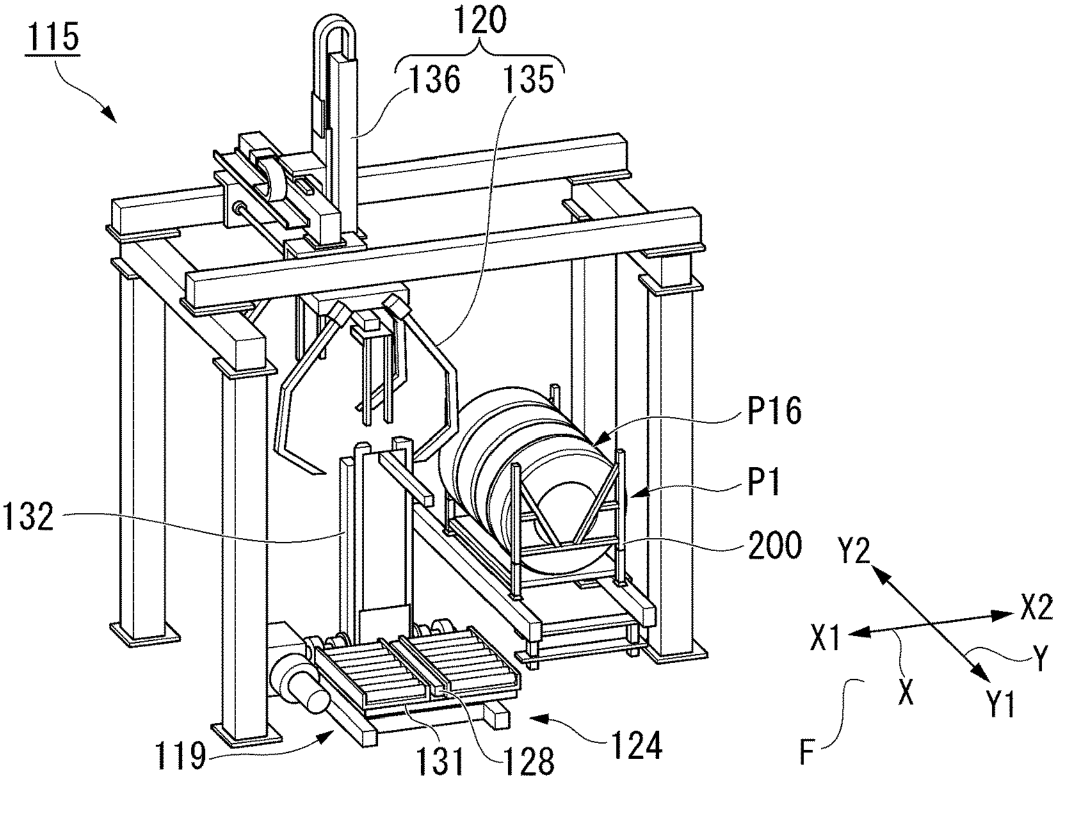
FIG. 20 is a perspective view explaining an operation of the same rack preparation section.

As shown in FIG. 14, the storage section 115 moves the pair of holding members 128 by operating the holding mechanism 124 of the posture changing unit 119 as a storage object positioning unit, and holds the stacked tires T10 transported to the standby position P17 from the stacking direction of the stacked tires T10. As shown in FIG. 15, the moving base 132 is moved to the tilted state P22 by the operation of the posture changing mechanism 125. As shown in FIG. 19, the stacked tires T10 that are present at the unloading position P18 and are held by the holding mechanism 124 configured on the moving base 132 being in the tilted state P22 are held by the storage holding portion 135, and the holding of the stacked tires T10 by the holding mechanism 124 is released, thereby completing the holding of the stacked tires T10 by the storage holding portion 135. As shown in FIG. 20, the storage holding portion 135 is moved between the storage position P16 and the unloading position P18, and the stacked tires T10 are transferred to the storage rack 200 that is in the storage enabled state P1.

After this, the storage rack 200 storing the stacked tires T10 is transported from the storage section 115 by the storage section rack transport unit 123, carried out to the outside of the shipment system 1, and the stacked tires T10 are shipped.

As described above, according to the storage rack supply system 2 of the present embodiment, the storage rack 200 that is in the storage disabled state P2 is supplied by the rack supply section 40, and the storage rack 200 that is in the storage disabled state P2 is transported from the rack supply section 40 to the rack preparation section 65 by the transport device 55. After that, the rack preparation section 65 changes the state from the storage rack 200 that is in the storage disabled state P2 to the storage rack 200 that is in the storage enabled state P1. Then, the storage rack 200 that is in the storage enabled state P1 is transported from the rack preparation section 65 by the rack unloading section 110, and can be unloaded.

In this way, switching of the state of the storage rack 200 from the storage disabled state P2 to the storage enabled state P1 is performed by a dedicated machine called the rack preparation section 65, and thus it is possible to efficiently carry out switching of the state of the storage rack 200 from the storage disabled state P2 to the storage enabled state P1.

The rack preparation section 65 has the preparation positioning unit 66 and the partition moving unit 67. The preparation positioning unit 66 performs positioning of the storage rack 200 that is in the storage disabled state P2. The partition moving unit 67 moves the engaging portion 90 and thereby the engaged portions 211*a* and 221*a* of the partition portions 211 and 221 that engage with the engaging portion 90 are moved. As a result, the partition portions 211 and 221 of the storage rack 200 are raised with respect to the base portion 202 and it is possible to set to the storage rack 200 that is in the storage enabled state P1.

The partition moving unit 67 has an engaging portion 90 with which the partition portions 211 and 221 are engaged, and the engagement position moving mechanism 96 that moves the engaging portion 90. With such a configuration, it is possible to correspond by moving the engaging portion 90 between the engagement position P11 that is capable of engaging with the partition portions 211 and 221 and the non-engagement position P12 that does not engage with the partition portions 211 and 221.

The partition moving unit 67 includes the engaging portion 90 with which the partition portion portions 211 and 221 are engaged, a first moving mechanism 94 that vertically moves the engaging portion 90, and a second moving mechanism 95 that horizontally moves the engaging portion 90. With such a configuration, it is possible to separately perform the vertical movement of the engaging portion 90 and the horizontal movement of the engaging portion 90 by the first moving mechanism 94 and the second moving mechanism 95.

The rack preparation section 65 includes the engaging portion 90 that engages with each of the partition portions 211 and 221, and the movement assisting unit 68 that moves the partition portions 211 and 221 to the respective intermediate positions P3 and P3 of the partition portions 211 and 221 by moving the engaging portion 90. With such a configuration, the partition portions 211 and 221 are moved to the respective intermediate positions P3 and P3, so that the base portion 202 and each of the partition portions 211 and 221 are separated from each other, the engaging portion 90 is arranged in a space formed by the above separation, and it becomes easier to engage with each of the partition portions 211 and 221.

The rack preparation section 65 has an upper partition detection portion 69 that detects the partition portion 211 arranged on the upper side of the two overlapping partition portions 211 and 221, and the controller 140 includes the discrimination unit 142 and the engagement position determination unit 143.

With such a configuration, it is possible to discriminate the partition portion 211 arranged on the upper side of the two overlapping partition portions 211 and 221. Further, based on the discrimination result of the discrimination unit 142 of the controller 140, the engagement position determination unit 143 can determine the second engagement position P26B (see FIGS. 17 and 18), which is the engagement position with respect to the second engaged portion 221*a* with which the engaging portion 90 is engaged. Then, the partition moving unit 67 moves the engaging portion 90 to the second engagement position P26B, which is the engagement position determined by the engagement position determination unit 143, and it is possible to raise the second partition portion 221 of the storage rack 200 to be moved first with respect to the base portion 202.

The rack supply section 40 has the rack placement portion 41 and the stack separation portion 42, the stack separation portion 42 has the rack separation unit 42*a*A including the rack engaging portion 45 and the rack lifting portion 46, and the rack transport unit 48.

With such a configuration, it is possible to separate one storage rack 200 that is in the storage disabled state P2 from a state in which a plurality of storage racks 200 being in the storage disabled state P2 are stacked.

Further, the shipment system 1 of the present embodiment includes the rack supply section 40 that supplies the storage rack 200 in the storage disabled state P2, the rack preparation section 65 that changes the state of the storage rack 200 from the storage disabled state P2 to the storage enabled state P1, and the rack unloading section 110 that unloads the storage rack 200 in the storage enabled state P1 from the rack preparation section 65. With such a configuration, it is possible to efficiently and continuously carry out switching of the storage rack 200 from the storage disabled state P2 to the storage enabled state P1.

Furthermore, the shipment system 1 of the present embodiment includes the storage section 115 that stores the object to be stored in the storage rack 200 that has been switched from the storage disabled state P2 to the storage enabled state P1 by the rack preparation section 65. With such a configuration, for example, it is possible to continuously prepare the storage racks 200 in the storage enabled state P1 with respect to storing of the tires T as the objects to be stored and to efficiently store them.

According to the shipment system 1 of this embodiment, the storage section 115 has the storage information acquisition portion 121 that acquires to-be-stored information given to the object to be stored, and the rack supply section 40 is provided with the first rack supply section 40A, the second rack supply section 40B, and the third rack supply section 40C as a supply section of the plurality of storage racks 200 corresponding to the type of the object to be stored. With such a configuration, even if there are multiple types and sizes of objects to be stored, the storage information acquisition portion 121 acquires the to-be-stored information that is given to the object to be stored, and thus, based on the to-be-stored information (tire information) of the acquired object to be stored (tire T), it is possible to select a rack supply section 40 to which a suitable storage rack 200 for storage is supplied according to the type of the object to be stored from among the storage racks 200 supplied to each rack supply section 40, and to supply the storage rack 200.

According to the shipment system 1 of the present embodiment, the storage rack supply system 2 includes a controller 140 that controls transport of the storage rack 200 from the rack supply section 40 based on tire information. The controller 140 has the storage rack determination unit 144 and a rack supply section determination unit 145. The controller 140 causes the storage rack determination unit 144 to determine a suitable storage rack 200 for storing from among the plurality of storage racks 200 prepared according to the type and size of the object to be stored (tire T) based on the to-be-stored object information (tire information) and to determine one rack supply section on which the determined storage rack 200 is placed from among the first rack supply section 40A, the second rack supply section 40B, and the third rack supply section 40C, and thus, it is possible to transport the suitable storage rack 200 for storing the object to be stored.

The shipment system 1 includes the storage object storing section 10 and the storage transport section 30. With such a configuration, the tires T1, T2, and T3 can be stored by the storage object storing section 10, and the tires T1, T2, and T3 can be transported from the storage object storing section 10 to the storage section 115 by the storage transport section 30.

The storage object storing section 10 has the storing area 11, the carry-in-section tire transport unit 12, the tire transport unit 13, and the carry-out-section tire transport unit 14. With such a configuration, the tires T are conveyed from the outside of the storing area 11 to the pick-up positions P7A and P7B inside the storing area 11 and a plurality of tires T of the same type and size are stacked, and it is possible to store the plurality of tires T in the storing area 11.

Moreover, it is possible to transport the tires T between the pick-up positions P7A and P7B, the carry-out positions P8A and P8B, and the storing area 11. Moreover, it is possible to transport the stacked tires T10 to the storage section 115 from the carry-out positions P8A and P8B.

The configuration of the storage rack supply system 2 and the like of the present embodiment can be variously modified as described below.

Figure 21:
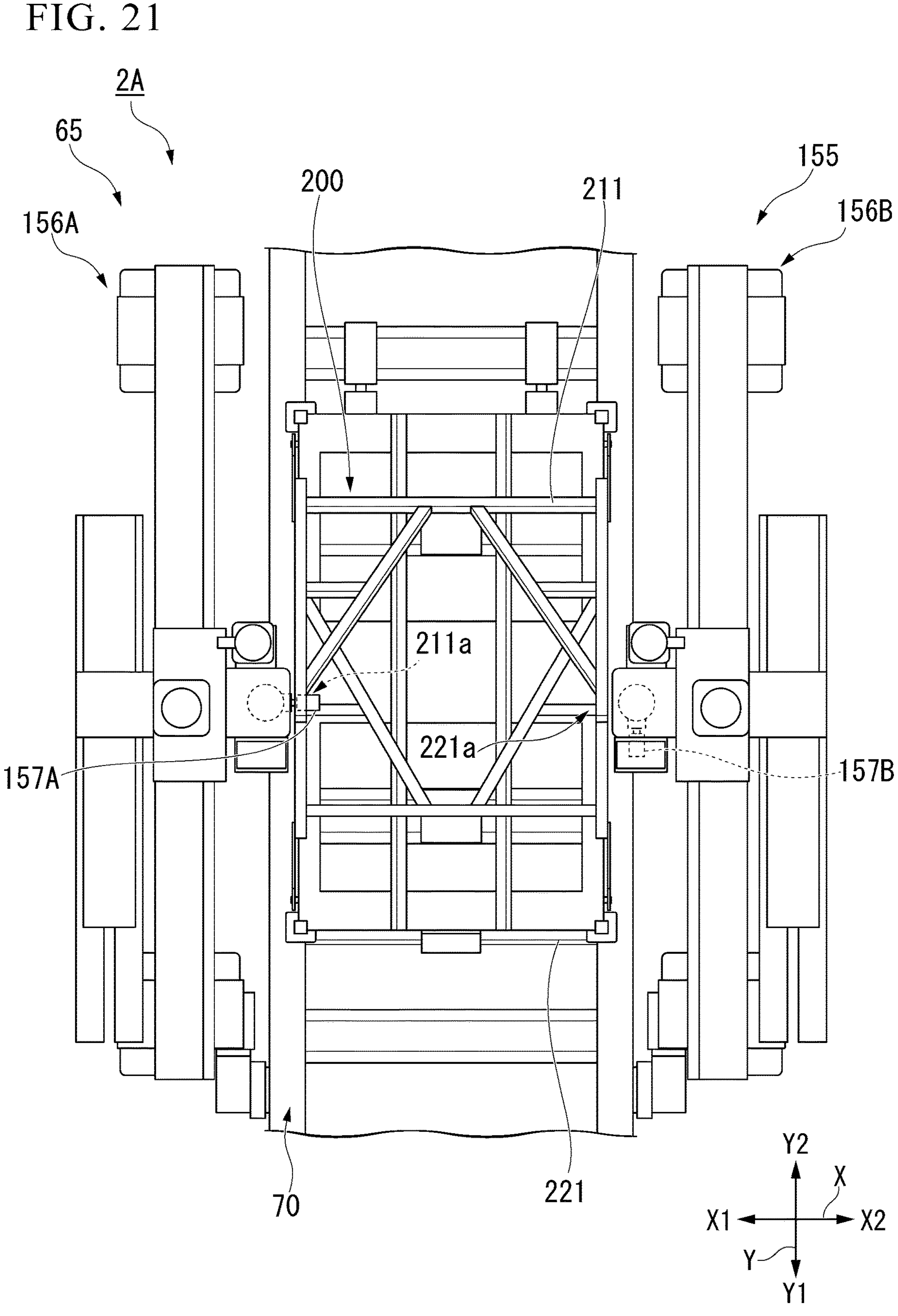
FIG. 21 is a plan view of the partition moving unit in the storage rack supply system of the first modified example of the embodiment of the present invention.
Figure 22:
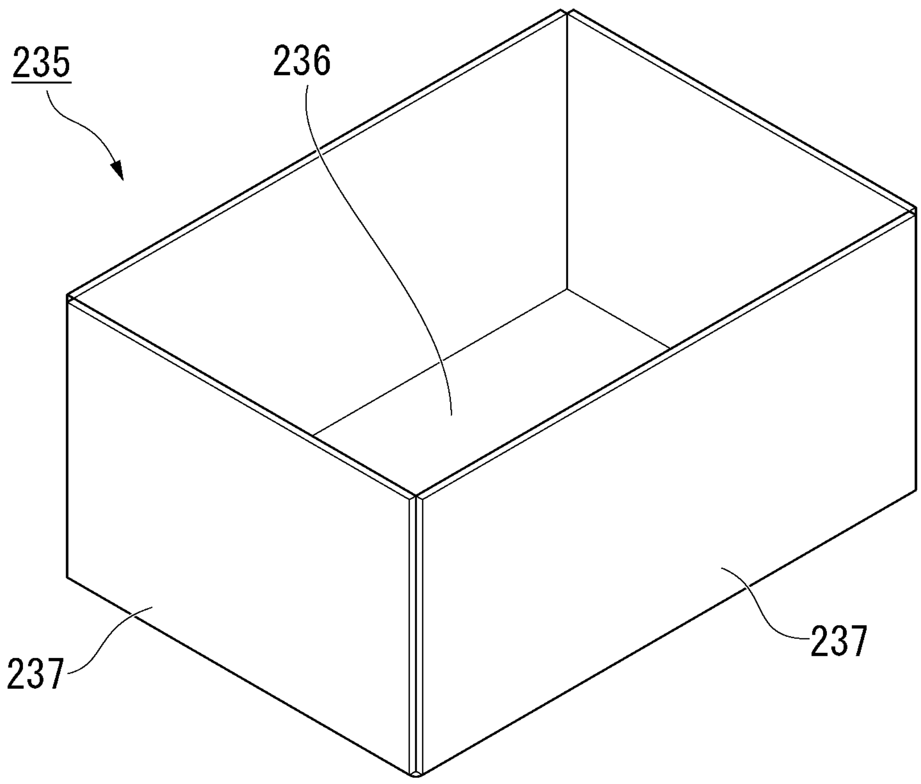
FIG. 22 is a perspective view of a storage rack according to a second modified example of the present invention.

A rack preparation section 65 configured in a storage rack supply system 2A of the first modification shown in FIG. 21 is provided with two partition moving units 155. The partition moving units 155 have a first partition moving unit 156A and a second partition moving unit 156B.

Each of the first partition moving unit 156A and the second partition moving unit 156B are configured similarly to the partition moving unit 67. The first partition moving unit 156A is arranged on one side of the preparation transport unit 70 in the width direction, and the second partition moving unit 156B is arranged on the other side of the preparation transport unit 70 in the width direction.

The first partition moving unit 156A has a first engaging portion 157A that is capable of engaging with a first engaged portion (engaged portion) 211*a* set in the first partition portion 211 or a second engaged portion (engaged portion) 221*a* set in the second partition portion 221.

In the first modification, the first engaging portion (engaging portion) 157A of the first partition moving unit 156A engages with the first engaged portion (engaged portion) 211*a* set in the first partition portion 211. The first partition moving unit 156A moves the first engaging portion 157A in the vertical direction and the second installation direction Y.

The second partition moving unit 156B is provided with a second engaging portion 157B that is capable of engaging with the first engaged portion (engaged portion) 211*a* set in the first partition portion 211 or the second engaged portion (engaged portion) 221*a* set in the second partition portion 221.

In the first modification, the second engaging portion (engaging portion) 157B of the second partition moving unit 156B engages with the second engaged portion (engaged portion) 221*a* set in the second partition portion 221.

The second partition moving unit 156 moves the second engaged portion 221*a* in the vertical direction and the second installation direction Y.

In the partition moving unit 155 of the rack preparation section 65 of the first modification, the first partition moving unit 156A moves one of the first partition portion 211 and the second partition portion 221, and the second partition moving unit 156B moves the other of the first partition portion 211 and the second partition portion 221. In FIG. 21, the first partition moving unit 156A moves the first partition portion 211 arranged on the positioning portion 73 side, and the second partition moving unit 156B moves the second partition portion 221 arranged on the stopping unit 72 side.

In addition, FIG. 21 does not show the stopping unit 72 or the positioning portion 73.

In the storage rack supply system 2A configured as described above, the first partition moving unit 156A moves the first engaging portion 157A, thereby moving the first partition portion 211 by engaging the first engaging portion 157A with the first engaged portion 211*a* of the first partition portion 211 arranged on the positioning portion 73 side. As a result, it is possible to use the first partition moving unit 156A exclusively for raising the first partition portion 211 of the storage rack 200 with respect to the base portion 202.

Similarly, the second partition moving unit 156B moves the second engaging portion 157B, thereby moving the second partition portion 221 by engaging the second engaging portion 157B with the second engaged portion 221*a* of the second partition portion 221 arranged on the stopping unit 72 side. As a result, it is possible to use the second partition moving unit 156B exclusively for raising the second partition portion 221 of the storage rack 200 with respect to the base portion 202.

The partition moving unit 155 employed in the rack preparation section 65 of the storage rack supply system 2A can improve work efficiency by moving the first partition portion 211 and the second partition portion 221 with the first partition moving unit 156A and the second partition moving unit 156B dividing the task thereof.

In addition, without providing the movement assisting unit 68 configured in the rack preparation section 65, one of the first partition moving unit 156A and the second partition moving unit 156B substitutes for the work performed by the movement assisting unit 68, and the other thereof may move the first partition portion 211 and the second partition portion 221. In addition, the first partition moving unit 156A and the second partition moving unit 156B may replace the moving mechanisms for moving each of the first engaging portion 157A and the second engaging portion 157B with multi-joint moving mechanisms, and may employ a dual-arm robot having each multi-joint movement mechanism on one support portion.

In the present embodiment, the storage rack is not particularly limited as long as it has the base portion and the partition portion. For example, as in a second modification shown in FIG. 22, a storage rack 235 may include a base portion 236 and four partition portions 237.

Each partition portion 237 is foldable with respect to the base portion 236. When sequentially moving the four partition portions 237 of the storage rack 235 described above, it is possible to employ the partition moving unit of the present embodiment.

As described above, one embodiment of the present invention has been described in detail with reference to the drawings, however the specific configuration is not limited to this embodiment, and the configuration can be changed, combined, deleted, or the like, without departing from the scope of the present invention.

For example, in the above embodiment, the partition moving unit 67 may not have to have the engagement position moving mechanism 96.

The partition moving unit 67 may have an integrated mechanism for moving the engaging portion 90 in the vertical direction and the second installation direction Y instead of the moving mechanisms 94 and 95.

The shipment system 1 may not have the discrimination unit 142, the engagement position determination unit 143, the storage rack determination unit 144, and the rack supply section determination unit 145.

The rack preparation section 65 may not have the upper partition detection portion 69.

The engaging portion may engage with the partition portion by attraction, electric or magnetic force.

The object to be stored is assumed to be a tire. However, the object to be stored is not limited to a tire, and may be a roll of paper, cloth, or the like, or may be a rectangular or circular plate-like member.

According to the present disclosure, it is possible to provide a storage rack supply system, a shipment system, and a storage rack handling device that efficiently switch from a storage disabled state to a storage enabled state of the storage rack. Therefore, there is great industrial applicability.

In addition, the present specification also discloses the following inventions.

APPENDIX CLAIM 1

A storage rack handling device handling a storage rack that includes a base portion and a partition portion being foldable with respect to the base portion and that is capable of being switched between a storage disabled state in which the partition portion is folded with respect to the base portion and a storage enabled state in which the partition portion is raised with respect to the base portion, the storage rack handling device comprising:

a preparation positioning unit that performs positioning of the storage rack being in the storage disabled state; and a partition moving unit that has an engaging portion engaging with an engaged portion set in the partition portion, and that moves the engaging portion.

APPENDIX CLAIM 2

The storage rack handling device according to appendix claim 1, further comprising a movement assisting unit that has an assisting engagement portion that moves the partition portion being in the storage disabled state to a position of the partition portion between a position of the partition portion in the storage rack being in the storage disabled state and a position of the partition portion in the storage rack being in the storage enabled state.

APPENDIX CLAIM 3

A storage rack supply system used for supplying the storage rack, comprising:

a rack supply section that supplies the storage rack being in the storage disabled state;

a storage rack handling device according to appendix claim 1 or 2;

a transport device that transports the storage rack being in a storage disabled state from the rack supply section to the storage rack handling device; and a rack unloading section that unloads the storage rack being in the storage enabled state from the storage rack handling device.

APPENDIX CLAIM 4

The storage rack supply system according to appendix claim 3, wherein the storage rack includes a first partition portion and a second partition portion as the partition portion, one of the first partition portion and the second partition portion that are in the storage disabled state is arranged above the other, the storage rack handling device has an upper partition detection portion that detects the partition portion positioned above from the first partition portion and the second partition portion, the storage rack supply system includes a controller that controls the partition moving unit, the engaging portion engages with a first engaged portion that is the engaged portion set in the first partition portion, the engaging portion engages with a second engaged portion that is the engaged portion set in the second partition portion, and wherein the controller includes:

a discrimination unit that is configured to discriminate, based on a detection result of the upper partition detection portion, which of the first partition portion and the second partition portion that are in the storage disabled state with respect to the base portion is positioned above, and an engagement position determination unit that is configured to determine, based on a discrimination result of the discrimination unit, a first engagement position with respect to the first engaged portion with which the engaging portion engages or a second engagement position with respect to the second engaged portion with which the engaging portion engages.

APPENDIX CLAIM 5

A shipment system comprising:

the storage rack supply system according to appendix claim 3 or 4; and a storage section that stores an object to be stored in the storage rack being in the storage enabled state, wherein the storage section includes the storage positioning unit that performs positioning of the storage rack being in the storage enabled state at a storage position that performs storing work of the object to be stored, the storage object positioning unit that performs positioning of the object to be stored before being stored, at an unloading position where unloading work of the object to be stored is performed, and the storage transfer unit that moves a storage holding portion holding the object to be stored between the storage position and the unloading position, and transfers the object to be stored to the storage rack being in the storage enabled state.

APPENDIX CLAIM 6

The shipment system according to appendix claim 5, wherein the storage section has a storage information acquisition portion that acquires to-be-stored information including a type and size of the object to be stored, and wherein the rack supply section includes a first rack supply section that supplies a first storage rack capable of storing the object to be stored having a first classification in type and size, and a second rack supply section that supplies a second storage rack capable of storing the object to be stored of a second classification different in at least one of type and size from the first classification.

APPENDIX CLAIM 7

The shipment system according to appendix claim 5 or 6, wherein the storage section has a storage information acquisition portion that acquires to-be-stored information including a type and size of the object to be stored, and wherein the rack supply section includes
- a first rack supply section that supplies a first storage rack capable of storing the object to be stored having a first classification in type and size, and
- a second rack supply section that supplies a second storage rack capable of storing the object to be stored of a second classification different in at least one of type and size from the first classification.

APPENDIX CLAIM 8

The shipment system according to any one of appendix claims 5 to 7, further comprising:
- a storage object storing section that stores a first object to be stored and a second object to be stored, the first object to be stored being the object to be stored having a first classification in type and size, the second object to be stored being the object to be stored having a second classification different in at least one of type and size from the first classification, and
- a storage transport section that transports the first object to be stored and the second object to be stored to the storage section.

wherein the object to be stored is a tire,
wherein the storage object storing section includes
- a storing area in which a plurality of tires including the tire of the same type and size are stacked and in which the plurality of tires are capable of being stored;
- a tire transport unit that is provided above the storing area, that picks up the tire from a pick-up position provided in the storing area, and that is capable of transporting the tire from the storing area or the pick-up position to a carry-out position of the tire provided in the storing area,
- a carry-in-section tire transport unit that conveys the tire from outside the storing area to the pick-up position, and
- a carry-out-section tire transport unit that transports the tire from the carry-out position to the storage transport section.

APPENDIX CLAIM 9

The shipment system according to claim 7,
wherein the object to be stored is a tire,
wherein the storage section includes
- a posture changing unit that changes a posture of stacked tires in which a plurality of tires including the tire are stacked in a stacking direction from a posture in which the stacking direction is along a vertical direction to a posture in which the stacking direction is along a horizontal direction, and
- a storage transport unit that transports the stacked tires to the posture changing unit, and wherein the posture changing unit includes
- a holding mechanism that holds the stacked tires from the stacking direction, and
- a posture changing mechanism that changes the posture of the stacked tires by moving the holding mechanism.

What is claimed is:

1. A storage rack supply system used for supplying a storage rack that includes a base portion and a partition portion that is foldable with respect to the base portion and that is capable of being switched between a storage disabled state in which the partition portion is folded with respect to the base portion and a storage enabled state in which the partition portion is raised with respect to the base portion, the storage rack supply system comprising:
- a rack supply section that supplies the storage rack being in the storage disabled state;
- a rack preparation section that changes the storage rack being in the storage disabled state to the storage rack being in the storage enabled state;
- a transport device that includes transport conveyers transporting the storage rack being in the storage disabled state from the rack supply section to the rack preparation section; and
- a rack unloading section that unloads the storage rack being in the storage enabled state from the rack preparation section.

2. The storage rack supply system according to claim 1, wherein the rack preparation section includes:
- a preparation positioning unit that is configured to perform positioning of the storage rack at a preparation position for performing preparation work of the storage rack; and
- a partition moving unit that has
  - an engaging portion being a rod-shaped member and being configured to engage with an engaged portion set in the partition portion, and
  - an engagement moving mechanism configured to move the engaging portion, wherein the preparation positioning unit includes
- a stopping unit that is configured to stop the storage rack at the preparation position, and
- a positioning portion that is configured to perform positioning of the storage rack at the preparation position, wherein the stopping unit has
- a locking portion that engages with the base portion, and
- a first drive portion that is configured to move the locking portion, wherein the positioning portion has
- a contact portion that is in contact with an end portion of the base portion, the end portion being a different portion with which the locking portion engages, and
- a second drive portion that is configured to move the contact portion to press the base portion toward the lock portion, and wherein the engagement moving mechanism includes
- a first moving mechanism that moves the engaging portion in a vertical direction and
- a second moving mechanism that moves the engaging portion in a horizontal direction.

3. The storage rack supply system according to claim 2, wherein the storage rack includes a first partition portion and a second partition portion as the partition portion,
- one of the first partition portion and the second partition portion that are in the storage disabled state is arranged above the other of the first partition portion and the second partition portion,
- the rack preparation section has an upper partition detection portion that detects the partition portion positioned above from the first partition portion and the second partition portion,
- the storage rack supply system includes a controller that controls the partition moving unit,
- the engaging portion engages with a first engaged portion that is the engaged portion set in the first partition portion, the engaging portion engages with a second engaged portion that is the engaged portion set in the second partition portion, and wherein the controller includes:

a CPU that is configured to discriminate, based on a detection result of the upper partition detection portion, which of the first partition portion and the second partition portion that are in the storage disabled state with respect to the base portion is positioned above, and generate a discrimination result, and determine, based on the discrimination result, a first engagement position with respect to the first engaged portion with which the engaging portion engages or a second engagement position with respect to the second engaged portion with which the engaging portion engages.

4. The storage rack supply system according to claim 2, wherein the partition moving unit includes:

the first moving mechanism that includes a first moving support member having a predetermined length in a vertical direction, and a first drive motor configured to move the first moving support member in the vertical direction, and the second moving mechanism that includes a fixed support member having a predetermined length in the horizontal direction, a second moving support member being movable along a guide rail provided on the fixed support member, and a second drive motor fixed to the second moving support member and for moving the second moving support member.

5. The storage rack supply system according to claim 1, wherein the rack supply section includes a rack placement portion on which a plurality of storage racks being in the storage disabled state are loaded and placed, the plurality of storage racks including the storage rack, and a stack separation portion that separates one storage rack being in the storage disabled state from the plurality of storage racks being in the storage disabled state, the stack separation portion includes a rack separation unit that includes a rack engaging portion that engages with the base portion of the storage rack, a rack lifting portion that is configured to elevate up and down the plurality of storage racks being in the storage disabled state, and a support base member to which the rack engaging portion and the rack lifting portion are fixed and which integrally supports the rack engaging portion and the rack lifting portion, and a rack transport unit that is a conveyor transporting the one storage rack being in the storage disabled state.

6. A shipment system used for shipping in which an object to be stored is stored in a storage rack, the storage rack including a base portion and a partition portion that is foldable with respect to the base portion, and the storage rack being capable of switching between a storage disabled state in which the partition portion is folded with respect to the base portion and a storage enabled state in which the partition portion is raised with respect to the base portion, the shipment system comprising:

a rack supply section that supplies the storage rack being in the storage disabled state;

a rack preparation section that changes the storage rack being in the storage disabled state to the storage rack being in the storage enabled state;

a transport device that includes transport conveyers transporting the storage rack being in the storage disabled state from the rack supply section to the rack preparation section;

a rack unloading section that unloads the storage rack being in the storage enabled state from the rack preparation section; and a storage section that stores an object to be stored in the storage rack being in the storage enabled state.

7. The shipment system according to claim 6, wherein the rack preparation section includes a preparation positioning unit that is configured to perform positioning of the storage rack at a preparation position for performing preparation work of the storage rack, and a partition moving unit that has an engaging portion being a rod-shaped member and being configured to engage with an engaged portion set in the partition portion, and an engagement moving mechanism configured to move the engaging portion, wherein the preparation positioning unit includes a stopping unit that is configured to stop the storage rack at the preparation position, and a positioning portion that is configured to perform positioning of the storage rack at the preparation position, wherein the stopping unit has a locking portion that engages with the base portion, and a first drive portion that is configured to move the locking portion, wherein the positioning portion has a contact portion that is in contact with an end portion of the base portion, the end portion being a different portion with which the locking portion engages, and a second drive portion that is configured to move the contact portion to press the base portion toward the lock portion, and wherein the engagement moving mechanism includes a first moving mechanism that moves the engaging portion in a vertical direction and a second moving mechanism that moves the engaging portion in a horizontal direction.

8. The shipment system according to claim 7, wherein the partition moving unit includes:

the first moving mechanism that includes a first moving support member having a predetermined length in a vertical direction, and a first drive motor configured to move the first moving support member in the vertical direction, and the second moving mechanism that includes a fixed support member having a predetermined length in the horizontal direction, a second moving support member being movable along a guide rail provided on the fixed support member, and a second drive motor fixed to the second moving support member and for moving the second moving support member.

9. The shipment system according to claim 6, wherein the storage section has a storage information acquisition portion that acquires to-be-stored information including a type and size of the object to be stored, and wherein the rack supply section includes a first rack supply section that supplies a first storage rack capable of storing the object to be stored having a first classification in type and size, and a second rack supply section that supplies a second storage rack capable of storing the object to be stored having a second classification different in at least one of type and size from the first classification.

10. The shipment system according to claim 9, further comprising a controller that controls transport of the storage rack from the rack supply section based on the to-be-stored information acquired by the storage information acquisition portion, wherein the controller includes a CPU that is configured to determine the rack supply section on which the storage rack corresponding to the type and size of the object to be stored is placed based on the to-be-stored information, and select the rack supply section to which the storage rack determined by the storage rack determination unit is supplied.

11. The shipment system according to claim 9, wherein the object to be stored is a tire, wherein the storage section includes a posture changing unit that changes a posture of stacked tires in which a plurality of tires including the tire are stacked in a stacking direction from a posture in which the stacking direction is along a vertical direction to a posture in which the stacking direction is along a horizontal direction, and a storage transport unit that changes the posture of the stacked tires and transports the stacked tires to the posture changing unit, and wherein the posture changing unit includes the posture transport unit being a roller conveyor, a holding mechanism that is a pair of holding members, holds the stacked tires between the pair of holding members from the stacking direction, the pair of holding members being bar-shaped members extending along a direction intersecting the stacking direction of the holding stacked tires, and a posture changing mechanism that has a support base, a moving base, and a drive unit, and that changes the posture of the stacked tires by moving the holding mechanism, the moving base, a lower end portion of which is supported by the support base and an upper end portion of which is configured to be movable in a predetermined angular range around the lower end portion of the moving base, and the moving base to which the holding mechanism is attached, the drive unit being configured to move the moving base.

12. The shipment system according to claim 6, further comprising:

a storage object storing section that stores a first object to be stored and a second object to be stored, the first object to be stored being the object to be stored of a first classification in type and size, the second object to be stored being the object to be stored of a second classification different in at least one of type and size from the first classification; and a storage transport section that transports the first object to be stored and the second object to be stored to the storage section.

13. The shipment system according to claim 12, wherein the object to be stored is a tire, and wherein the storage object storing section includes a storing area in which a plurality of tires including the tire of the same type and size are stacked and in which the plurality of tires are capable of being stored;

a tire transport unit that is provided above the storing area, and that is capable of transporting the tire to a carry-out position of the tire provided in the storing area, a carry-in-section tire transport unit that is a conveyor conveying the tire from outside the storing area to a pick-up position provided in the storing area, and a carry-out-section tire transport unit that includes a conveyor transporting the tire from the carry-out position to the storage transport section.

14. A storage rack handling device handling a storage rack that includes a base portion and a partition portion being foldable with respect to the base portion and that is capable of being switched between a storage disabled state in which the partition portion is folded with respect to the base portion and a storage enabled state in which the partition portion is raised with respect to the base portion, the storage rack handling device comprising:

a preparation positioning unit that is configured to performs positioning of the storage rack at a preparation position for performing preparation work of the storage rack; and a partition moving unit that has an engaging portion being a rod-shaped member and being configured to engage with an engaged portion set in the partition portion, and an engagement moving mechanism configured to move the engaging portion, wherein the preparation positioning unit includes a stopping unit that is configured to stop the storage rack at the preparation position, and a positioning portion that is configured to perform positioning of the storage rack at the preparation position, wherein the stopping unit has a locking portion that engages with the base portion, and a first drive portion that is configured to move the locking portion, wherein the positioning portion has a contact portion that is in contact with an end portion of the base portion, the end portion being a different portion with which the locking portion engages, and a second drive portion that is configured to move the contact portion to press the base portion toward the lock portion, and wherein the engagement moving mechanism includes a first moving mechanism that moves the engaging portion in a vertical direction and a second moving mechanism that moves the engaging portion in a horizontal direction.

15. The storage rack handling device according to claim 14, wherein the partition moving unit includes an engagement moving mechanism that is configured to move the engaging portion between an engagement position where the engaging portion is capable of engaging with the partition portion and a non-engagement position where the engaging portion is disabled from being engaged with the partition portion.

16. The storage rack handling device according to claim 14, wherein the partition moving unit includes:

the first moving mechanism that includes a first moving support member having a predetermined length in a vertical direction, and a first drive motor configured to move the first moving support member in the vertical direction, and the second moving mechanism that includes a fixed support member having a predetermined length in the horizontal direction, a second moving support member being movable along a guide rail provided on the fixed support member, and a second drive motor fixed to the second moving support member and for moving the second moving support member.

17. The storage rack handling device according to claim 14, further comprising a movement assisting unit that has an assisting engagement portion that moves the partition portion being in the storage disabled state, wherein the movement assisting unit has an assisting engagement portion formed in a flat plate shape and having a flat portion along a horizontal plane, and a drive portion configured to move the assisting engagement portion in the vertical direction, and is configured to move the partition portion to a position between a position of the partition portion in the storage rack being in the storage disabled state and a position of the partition portion in the storage rack being in the storage enabled state.

18. The storage rack handling device according to claim 14, wherein the storage rack includes a first partition portion and a second partition portion as the partition portion, wherein the partition moving unit includes a first partition moving unit and a second partition moving unit, wherein the first partition moving unit and the second partition moving unit each include the engaging portion and the engagement moving mechanism, wherein the second partition moving unit is arranged on an opposite side of the first partition moving unit across the storage rack, and wherein the engaging portions of the first partition moving unit and the second partition moving unit are configured to engage with the respective engaged portions of the first partition portion and the second partition portion.

19. The storage rack handling device according to claim 18, wherein the first partition moving unit and the second partition moving unit each include the first moving mechanism and the second moving mechanism, wherein the first moving mechanism that includes a first moving support member having a predetermined length in a vertical direction, and a first drive motor configured to move the first moving support member in the vertical direction, and wherein the second moving mechanism that includes a fixed support member having a predetermined length in the horizontal direction, a second moving support member being movable along a guide rail provided on the fixed support member, and a second drive motor fixed to the second moving support member and for moving the second moving support member.

* * * * *